United States Patent [19]

Bloomberg

[11] Patent Number: 5,761,686
[45] Date of Patent: Jun. 2, 1998

[54] EMBEDDING ENCODED INFORMATION IN AN ICONIC VERSION OF A TEXT IMAGE

[75] Inventor: Dan S. Bloomberg, Palo Alto, Calif.

[73] Assignee: Xerox Corporation, Stamford, Conn.

[21] Appl. No.: 671,423

[22] Filed: Jun. 27, 1996

[51] Int. Cl.[6] .......................... G06F 17/00; G06K 19/06
[52] U.S. Cl. ............................... 707/529; 382/232
[58] Field of Search ....................... 395/788–791, 395/761; 382/180, 232, 243, 112; 707/526–529

[56] References Cited

U.S. PATENT DOCUMENTS

| | | | |
|---|---|---|---|
| 4,716,438 | 12/1987 | Farrell | 399/84 |
| 4,728,984 | 3/1988 | Daniele | 358/300 |
| 4,786,940 | 11/1988 | Daniele | 347/129 |
| 5,060,980 | 10/1991 | Johnson et al. | 283/70 |
| 5,065,437 | 11/1991 | Bloomberg | 382/176 |
| 5,091,966 | 3/1992 | Bloomberg et al. | 382/203 |
| 5,128,525 | 4/1992 | Stearns et al. | 235/454 |
| 5,131,049 | 4/1992 | Bloomberg et al. | 382/257 |
| 5,168,147 | 12/1992 | Bloomberg | 235/456 |
| 5,181,255 | 1/1993 | Bloomberg | 382/176 |
| 5,202,933 | 4/1993 | Bloomberg | 382/176 |
| 5,221,833 | 6/1993 | Hecht | 235/494 |
| 5,245,165 | 9/1993 | Zhang | 235/454 |
| 5,272,764 | 12/1993 | Bloomberg et al. | 382/164 |
| 5,278,400 | 1/1994 | Appel | 235/494 |
| 5,315,098 | 5/1994 | Tow | 235/494 |
| 5,444,779 | 8/1995 | Daniele | 380/3 |
| 5,449,895 | 9/1995 | Hecht et al. | 235/494 |
| 5,459,307 | 10/1995 | Klotz, Jr. | 235/454 |
| 5,486,686 | 1/1996 | Zdybel, Jr. et al. | 235/375 |
| 5,682,540 | 10/1997 | Klotz, Jr. et al. | 395/776 |

OTHER PUBLICATIONS

Digimarc Corporation, url: www.digimarc.com; Digimarc Announcement, dated Jun. 27, 1995, and Frequently Asked Questions, available and printed from World Wide Web site during Aug., 1996.

Mansour, M., "Multi-Tiered Condensed Bar Code," *IBM Technical Disclosure Bulletin*, vol. 26, No. 2, Jul. 1983, pp. 766–767.

Brassil et al., "Electronic Marking and Identification Techniques to Discourage Document Copying", *IEEE Journal on Selected Areas in Communications*, vol. 12, No. 8, Oct. 1995, pp. 1495–1504.

(List continued on next page.)

*Primary Examiner*—Joseph R. Burwell
*Attorney, Agent, or Firm*—Judith C. Bares

[57] ABSTRACT

An encoding operation encodes binary data that is then embedded in an iconic, or size-reduced, version of an original text image, in a position in the iconic image that replaces a text portion in the original text image. The encoding operation produces rectangular blocks that have a foreground color and size dimensions proportional to the iconic image so that when placed in the iconic image in horizontal lines, the blocks appear to a viewer to be representative of the text portion of the original image that they replace. Exemplary encoding operations are described, including operations based on run-length limited encoding. A second message may be encoded in the background color regions that separate the blocks. The message carried by the binary data may be any information suitable for a particular application, and need not be restricted to information about or related to the original image. The encoding operation is designed to be robust for decoding purposes regardless of the resolution at which a copy of the iconic image is subsequently rendered. The iconic image may be printed in a suitable place (e.g., the margin or other background region) in the original text image so that a text image so annotated will then always carry the embedded data in subsequent copies made from the annotated original. The iconic image alone may also be used in printed form or as part of a graphical user interface as a surrogate for the original text image in a variety of applications.

20 Claims, 15 Drawing Sheets

OTHER PUBLICATIONS

D.S. Bloomberg, "Multiresolution morphological analysis of document images", *SPIE Conf. 1818, Visual Communications and Image Processing* '92, Boston, MA, Nov. 1992, pp. 648–662.

Mark Peairs, "Iconic Paper", *Proceedings of the International Conference on Document Analysis and Recognition*, Montreal, Canada, Sep. 1995, pp. 1174–1179.

Kermit Norris, "Channel Capacity of Charge–Constrained Run–Length Limited Codes", *IEEE Transactions on Magnetics*, vol. Mag.–17, No. 6, Nov. 1981, pp. 3452–3455.

Story et al., "The RightPages Image–Based Electronic Library for Alerting and Browsing", *IEEE Computer*, Sep. 1992, pp. 17–26.

Susan Weixel, *Word 6 for Windows Quickstart*, Que Corporation, Indianapolis, IN, 1994, pp. 47–48, 154–155.

72
```
1001010011010110111011101100011001110110011
0001011001011011000110011110101001011000100
1101001011010001001111010100100101000100100
1011100010010001000111101001111011010110100
0001101101110101010001110101100011010010010
...
```

EMBEDDING ENCODED INFORMATION IN AN ICONIC VERSION OF A TEXT IMAGE

BACKGROUND OF THE INVENTION

The present invention relates generally to a processor-based technique in the fields of information encoding and image processing, and more particularly, to a process for encoding binary information and embedding the encoded information in an iconic image version of a text image.

Image encoding techniques are used in a wide variety of applications, including image compression and error detection and correction methods, and for the purpose of changing a characteristic or property of the data to meet the requirements of an application. Related to image encoding techniques are a variety of techniques to insert, or embed, encoded information in an image. Bar codes explicitly insert encoded information in an image, and may be used in applications where the obvious and perceptible presence of the encoded information is not a disadvantage. U.S. Pat. No. 5,278,400, assigned to the assignee of the present invention and entitled "Multiple Threshold Encoding of Machine Readable Code," discloses a method and apparatus for applying coded data to a substrate and decoding the data where the data are encoded in uniformly sized groups of pixels, called cells. Each cell is encoded by distinctively marking a certain number of the pixels to represent the code, without regard to the position in the cell of a marked pixel. For example, a cell comprised of six pixels each of which may be marked in black or white provides for seven possible black-white combinations of the pixels in the cell; a series of three cells provides for $7^3$ possible coded combinations, more than enough to encode the 256 character ASCII character set with only 18 pixels. The characteristics of the marking of each cell are preferably the same to facilitate robustness for decoding purposes.

Data glyph technology is a category of embedded encoded information that is particularly advantageous for use in applications that require the embedded data to be robust for decoding purposes yet inconspicuous, or even surreptitious, in the resulting image. Data glyph technology encodes digital information in the form of binary 1's and 0's which are then rendered in the form of very small linear marks. Generally, each small mark represents a digit of binary data; whether the particular digit is a digital 1 or 0 depends on the linear orientation of the particular mark. For example, in one embodiment, marks which are oriented from top left to bottom right may represent a 0, while marks oriented from bottom left to top right may represent a 1. The individual marks are of such a size relative to the maximum resolution of a printing device as to produce an overall visual effect to a casual observer of a uniform gray halftone area when a large number of such marks are printed together on paper, and the halftone area in the document, when incorporated in an image border or graphic, does not explicitly suggest that embedded data is present. A viewer of the image could perhaps detect only by very close scrutiny that the small dots forming the gray halftone area are a series of small marks which together bear binary information. U.S. Pat. Nos. 5,091,966, 5,128,525, 5,168,147, 5,221,833, 5,245,165, 5,315,098, and 5,449,895, and U.S. patent application Ser. No. 07/560,514, all assigned to the assignee of the present invention, provide additional information about the uses, encoding and decoding techniques of data glyphs. For example, U.S. Pat. No. 5,315,098, entitled "Methods and Means for Embedding Machine Readable Digital Data in Halftone Images," discloses techniques for encoding digital data in the angular orientation of circularly asymmetric halftone dot patterns that are written into the halftone cells of digital halftone images, and U.S. Pat. No. 5,168,147 by the named inventor herein and entitled "Binary Image Processing for Decoding Self-Clocking Glyph Shape Codes," discloses image processing techniques, including image morphology techniques, for decoding glyph codes embedded in scanned images.

U.S. Pat. No. 5,486,686, assigned to the assignee of the present invention and entitled "Hardcopy Lossless Data Storage and Communications for Electronic Document Processing Systems," discloses an improvement to an electronic document processing system for transferring information back and forth between an electronic domain and a hardcopy domain. An interface means is provided between a computer that operates on and stores electronic document files and a printing device, where the printing device prints on a hardcopy document both the human readable renderings of an electronic document and machine readable attributes of the electronic document. The machine readable attributes are recoverable from the code printed on the hardcopy document when information carried by the document is transformed from the hardcopy domain to the electronic domain, such as for example by scanning the physical document. Data glyphs are disclosed as a way of encoding the machine readable attributes of the electronic document on the hardcopy document. It is disclosed that all or only selected portions of the ASCII content of the electronic document, the document description language definition of the electronic document, or the printer description language definition of the document may be printed on the hardcopy document. When a sufficient amount of information is encoded, the physical document serves as a lossless data storage mechanism for the electronic document.

One category of embedded data applications involves document marking, which is the practice of embedding one or more codewords in a document image that are substantially indiscernible to a reader but that can be reliably recovered and decoded; this practice may be referred to as applying a "digital watermark," analogous to the practice of marking paper with a largely indiscernible design during manufacture. Document marking is typically achieved by altering the text formatting in a document, or by altering certain characteristics of textual elements (e.g., characters), in a manner that is both reliably able to be decoded even in the presence of noise and that is largely indiscernible to a reader. The goal of concealment of the embedded data is typically an important one in those applications in which the document is being marked so that it may be traced or authenticated.

Brassil et al., in "Electronic Marking and Identification Techniques to Discourage Document Copying" in *IEEE Journal on Selected Areas in Communications*, Vol. 12, No. 8, October 1995, pp. 1495–1504, disclose three techniques for embedding a unique codeword in a document that enables identification of the sanctioned recipient of the document while being largely indiscernible to document readers, for the purpose of discouraging unauthorized document distribution. The image coding schemes were designed to be attack-resistant by ensuring that substantial effort would be required to remove the document encoding, and that successful removal of the encoding would result in a substantial loss of document presentation quality. The techniques disclosed include line shift coding, word shift coding and feature coding. Use of these techniques in the resulting image is typically not noticeable to a viewer of the image, and text in the image is not substantively altered. With respect to line shift coding, Brassil et al. disclose that each intended document recipient is preassigned a unique codeword that specifies a set of text lines to be moved in the document specifically for that recipient. The codeword is decoded by performing image analysis on a copy of the document to detect the moved lines and reconstruct the codeword to identify the authorized recipient.

A common practice in computer-implemented graphical user interfaces is to use small graphical images called "icons" to represent software applications and functions. The advantages of using icons have been applied to the domain of images, and reduced-size versions of images, often called "thumbnail" images, have been used in several contexts. In a reduced version of an image, the characteristic page layout appearance of the full size page is preserved and objects are proportionally reduced and placed in positions in the thumbnail image that are substantially equivalent to positions in the full size version of the image. The preservation of the page layout features of the full size version of the image, such as the margin dimensions, the placement of headers and footers, the spacing between paragraphs and of lines within paragraphs, the presence or absence of text justification, and the proportional reduction of text in various font sizes, all contribute to producing a thumbnail image which, because of human pattern matching abilities, is easily recognizable to a viewer as representative of the full size image. A reduced sized version of an original image that substantially preserves visually significant page layout features of the full size version of the image will be referred to herein as an iconic version of the original image, or simply as an iconic image.

Iconic images have been used in computer-implemented applications to augment and exploit human memory and pattern matching skills. Story et al., in "The RightPages Image-Based Electronic Library for Alerting and Browsing," in *IEEE Computer,* September 1992, pp. 17–26, discloses a prototype electronic library that provides certain library services to its users. A user interface shows an image area including "stacks" containing reduced-size images of journal covers that users can view in a way analogous to viewing journal covers on library shelves. To examine the contents of a particular journal, the user selects a journal with a mouse, and the system displays an image of the table of contents. In addition to saving display space, the use of thumbnail image versions of the journals' covers exploits the user's familiarity with the appearance of the covers of publications in a particular field of science.

Mark Peairs in "Iconic Paper" in *Proceedings of the International Conference on Document Analysis and Recognition,* Montreal, Canada, 1995, pp. 1174–1179, discloses a technique that uses thumbnail images, referred to as icons, to retrieve documents from an electronic database. The technique provides a physical sheet of paper as a representation that can be used by humans for recognition and by machines for indexing. A document can be accessed by a gesture indicating a particular icon on the page. The technique exploits the pattern matching abilities of the human user using page characteristics of the original image that are still identifiable at the selected reduction scale. To employ the pattern recognition method, a text retrieval operation uses character counts of each word of text in document images to index a table of document identifiers that can then be used to locate the original page or document in a data base. Character positions in an original page of text are determined and a special pixel pattern is positioned on a one-for-one basis in the icon in place of each character in order to preserve the ability to compute character counts of words in the reduced version of the image. During a retrieval operation, an iconic image is selected by a user, the special pixel patterns are located in the iconic image, counts of the lengths of words are made, and the counts converted to an index in the table for retrieving the original image.

SUMMARY OF THE INVENTION

The present invention is premised on the observation that, for many applications, techniques for embedding information unobtrusively in an image can be combined with the use of an iconic image representation in order take advantage of the benefits of encoding useful information in an indiscernible manner while retaining the ability to exploit human pattern matching capabilities for those applications where such capabilities provide leveraged functionality. In addition, the iconic image serves as a useful mechanism for inconspicuously embedding digital information in images in any application where the presence of an iconic image is provided as a surrogate for a full-sized version of an image, regardless of whether the iconic image is specifically used for the purpose of providing clues for recognizing the full-sized image.

The iconic image includes embedded encoded data in a position where the reduced version of text in the original text image would appear, and are rendered as a series of rectangular blocks. At the reduced size, these rectangular blocks appear as straight lines and have the appearance of the familiar "greeked" text, a technique that is used to replace the rendering of actual text when rendering actual text reduces performance or efficiency of an operation. Thus, a viewer of the iconic image who is unable to see a reduced version of the text is not likely to interpret the "greeked" text as a signal of the presence of embedded data, but is more likely to interpret it as a normal consequence of the image reduction operation.

The encoding operation may implement any suitable encoding scheme that produces rectangular blocks that have a foreground color and that have size dimensions proportional to the iconic image so that when placed in the iconic image, the rectangular blocks appear to a viewer to be representative of a text portion of the original image. A significant advantage of the present invention is that the message carried by the binary data and the resulting rectangular blocks may be any information suitable for a particular application, and need not be restricted to a reproduction of, or information about, the text in the original image that the encoded data replaces. This advantage of the present invention may be referred to as the advantage of encoding "arbitrary" binary data, in the sense that the message of the encoded data need bear no relationship to any text included in the full size image nor to any information about the full size image.

The iconic image may be rendered and printed in a suitable place (e.g., the margin or other background region) in the original text image; a text image annotated with an iconic image of the type produced by the invention win then always carry the embedded data in subsequent copies made from the annotated original. The iconic image alone may also be used in printed form or as part of a graphical user interface as a surrogate for the original text image in a variety of applications.

The encoding operation is designed to be robust for decoding purposes to permit reliable and accurate recovery of the encoded information regardless of the resolution at which a copy of the iconic image is subsequently rendered. The use of rectangular blocks that approximate the size of words in text to contain the encoded data provides a significant advantage in robustness and reliability of decoding: rectangular blocks are relatively straightforward to detect reliably in image segmentation operations, and are likely to suffer less from the problem of touching components than would the use of character-by-character encoding. Rectangular blocks are also robust for applications in which the iconic image is printed or scanned using low resolution devices that may introduce noise or distortion into the image data representing the iconic image.

Therefore, in accordance with one aspect of the present invention, a method is provided for operating a processor-controlled machine to encode binary data in an iconic version of an input text image. The machine includes a signal source for receiving data; memory for storing data; and a processor connected for accessing instruction data stored in the memory for operating the machine; the processor is further connected for receiving data from the signal source; and connected for storing data in the memory. The method comprises receiving image definition data defining an input text image from the signal source. The input text image has a characteristic page layout appearance perceptible to a human viewer when the input text image is rendered and displayed for viewing. The input text image includes at least one image region that includes image definition data defining text, which is referred to herein as an original text region. The processor also receives from the signal source binary data indicating a message to be encoded, and image position input data. The processor performs an encoding operation using the binary data and using the image position input data to produce image definition data defining a plurality of rectangular blocks each having a foreground color; each rectangular block is referred to as an encoded data block. An image reduction operation is performed using the input text image, and produces image definition data defining a reduced version of the input text image, referred to as an iconic image. The iconic image has the characteristic page layout appearance of the input text image when rendered for display and viewed by the user; thus, objects included in the input text image are perceptible in the iconic image as having proportionally reduced dimensions in positions therein substantially equivalent to the positions of the objects in the input text image. The method then includes producing the iconic image including the encoded data blocks. The encoded data blocks are positioned in the iconic image in place of a reduced version of the original text region of the input text image. The encoded data have size dimensions suitable for inclusion in the iconic image, and are arranged in horizontal lines separated vertically by image regions of a background color, thus producing the visual perception of lines of text.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

DETAILED DESCRIPTION OF THE INVENTION

A. General Operation of the Invention

Figure 1:
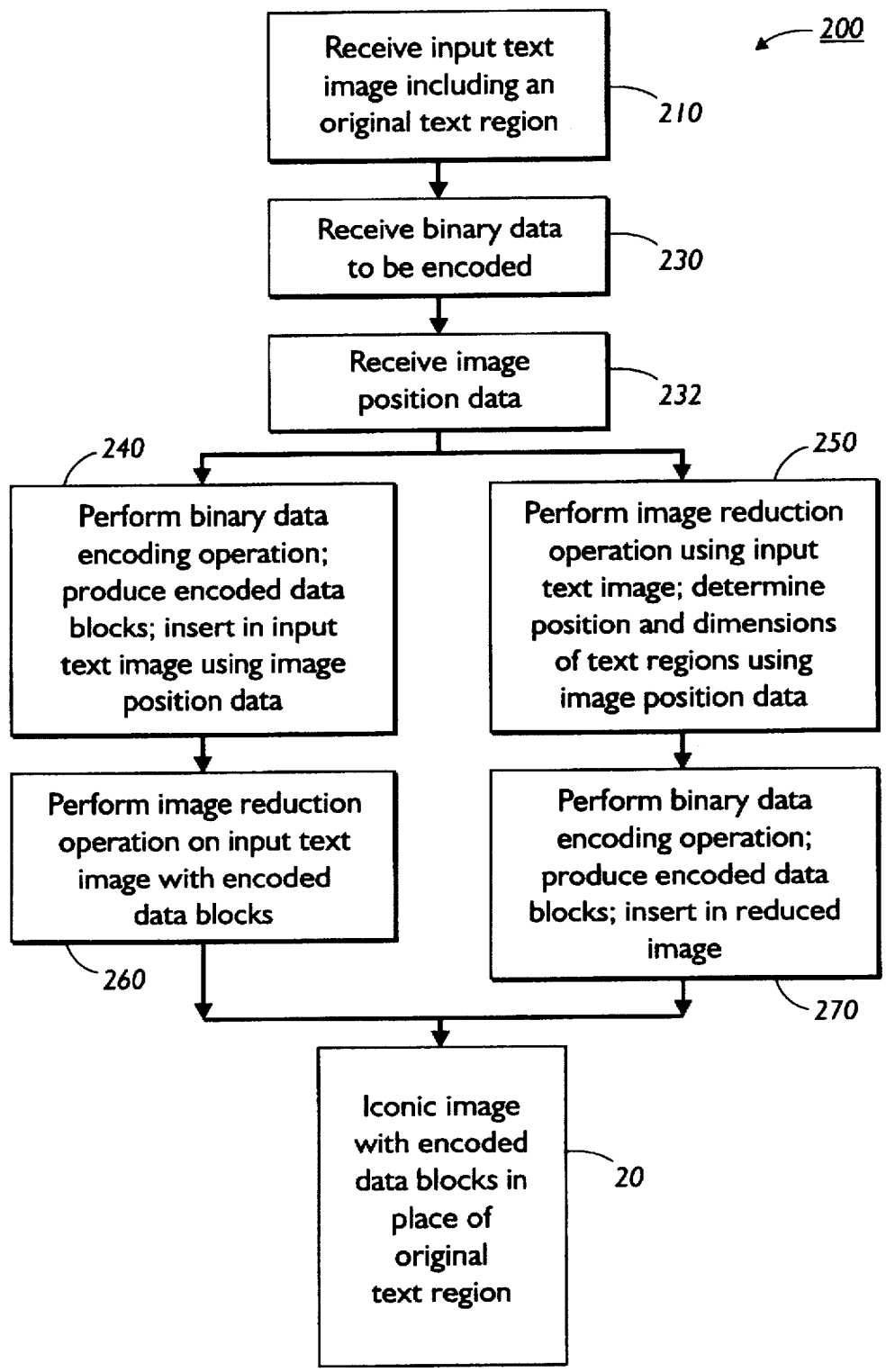
FIG. 1 is a flowchart illustrating the general operation of the invention for encoding binary data in an iconic image version of an original input text image according to the invention.

FIG. 1 is a flowchart illustrating operation 200 of the present invention for encoding binary data and embedding the encoded data in an iconic version of an input text image. The input data needed to carry out operation 200 are received in boxes 210, 230 and 232. These include: image definition data defining an input image having at least one image region composed of image definition data defining images of characters; binary data to be encoded; and image position input data for use in determining the locations of image positions in the output iconic image version of the input image in which the encoded binary data is to be placed.

1. Input text image

The term "input text image" will be used to refer to the image definition data defining the input image. The input text image includes at least one image region composed of image definition data defining images of characters, generally collectively referred to as text; As used herein, a "character" is a single, discrete, abstract element or symbol and includes not only alphabetic and numerical elements, but also punctuation marks, diacritical marks, mathematical and logical symbols used in mathematical notation such as equations, and phonetic, ideographic, or pictographic elements. For example, symbols in pictographic languages and symbols representing musical notation are included in the term character. A sequence of characters forms a "text" or "string". Image definition data defines a text image when a plurality of character images occur in the space defined by the image. Images of the type suitable as input to the present invention are assumed to be rectangular, and to have an image coordinate system in which x increases in a horizontal direction to the right, y increases in a vertical direction downward, and x=y=0 is at the upper left corner of the image. An image location is given by a set of image coordinates, (x, y). Each location in an image may be called a "pixel." In an array defining an image in which each item of data provides a value, each value indicating the color of a location may be called a "pixel value". Each pixel value is a bit in the "binary form" of the image, a grayscale value in a "grayscale form" of the image, or a set of color space coordinates in a "color coordinate form" of the image, the binary form, grayscale form, and color coordinate form each being a two-dimensional array defining the image.

Figure 2:
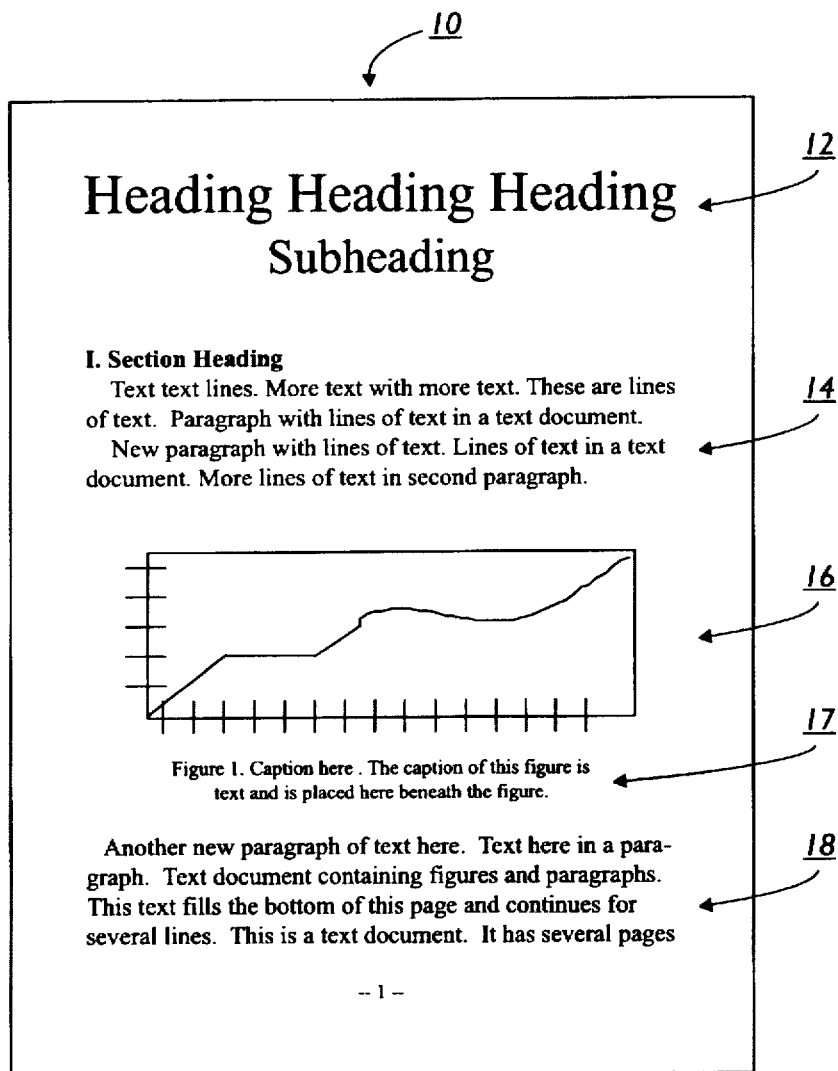
FIG. 2 illustrates an original text image that is suitable for input to the present invention, and illustrates an iconic version of the original text image produced according to the present invention.
Figure 2:
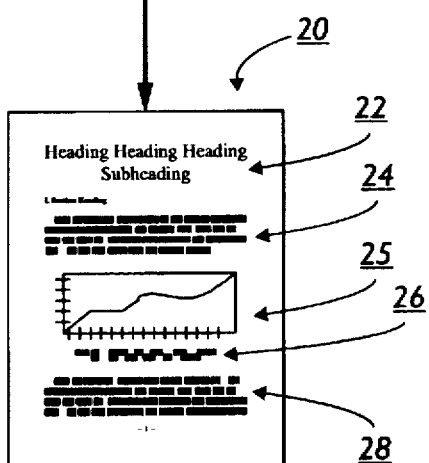

FIG. 2 shows input text image 10 which is a suitable representative input text image for the present invention. Input text image 10 includes an image region 12 that includes textual headings, image regions 14 and 18 that include paragraphs of text, an image region 16 that includes a graphical object and image region 17 indicating another text area that can be seen to indicate a caption for the figure that is the graphical object in image region 16. It can be seen that input text image 10 has a characteristic page layout appearance that includes specific margin dimensions, specific placement of a footer with a page number, distinctive spacing between paragraphs and of lines within paragraphs, the absence of text justification at the right margin, and text that appears in various font sizes, which together contribute to producing a distinctive overall visual appearance.

FIG. 2 also shows iconic image 20, a reduced size version of input text image 10 that is produced by the technique of the present invention. It can be seen that iconic image 20 has preserved the distinctive overall visual appearance of input text image 10.

2. Binary data to be encoded

Figures 3, 4:
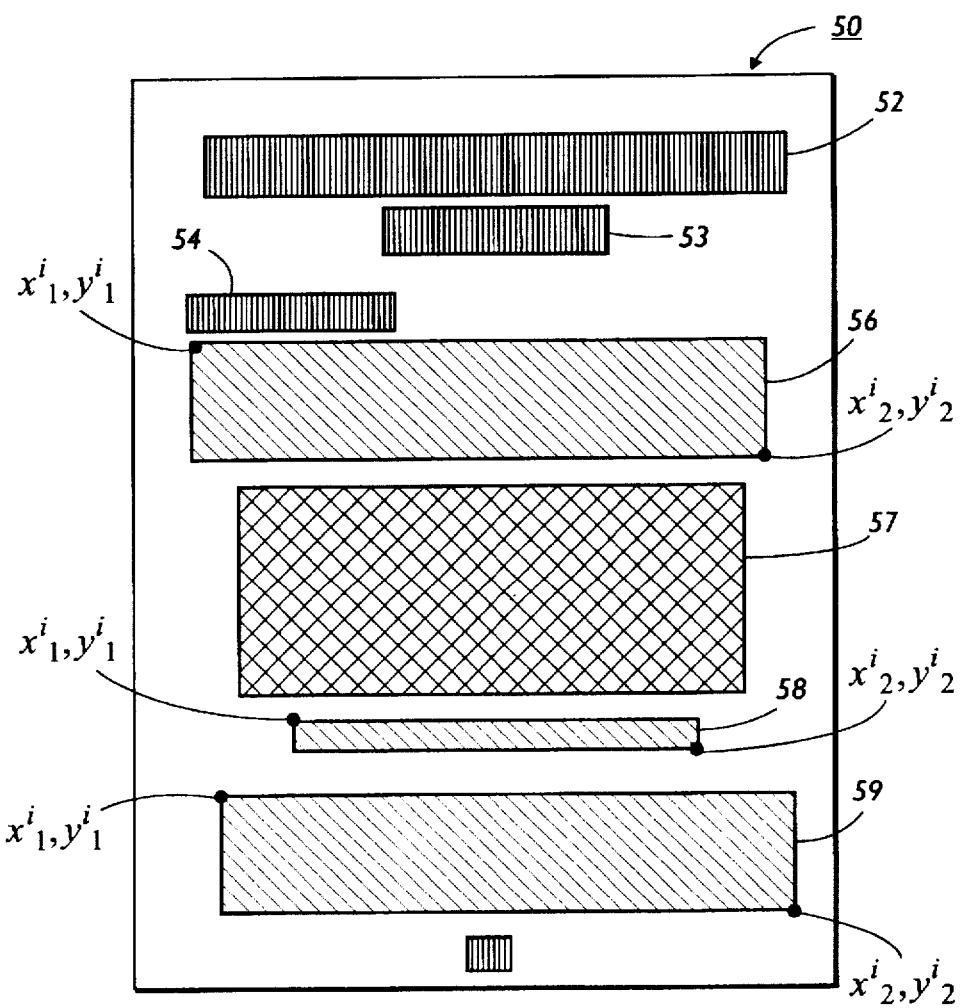
FIG. 3 illustrates an example of binary data to be encoded according to the present invention.
FIG. 4 is a schematic view of the original input text image of FIG. 2 after the results of an image segmentation operation has identified component parts, including the text portions, of the image.

FIG. 3 illustrates a representative sample of binary data 70 for encoding according to an encoding operation of the present invention. Binary data 70 is not restricted in any way as to the nature of the information it may convey, and may, for example, represent character symbols in a language using ASCII or UNICODE character encoding, or the compressed or encrypted form of such symbols. Binary data 70 may also indicate instruction data of the type used to operate a processor that controls a machine having the configuration of machine 100 in FIG. 20. Examples of such machines include a computer, printer, scanning device or facsimile device, or a machine that combines these functions.

The information represented by binary data 70 may be, but need not be, related to input text image 10; for example, binary data 70 may represent the actual text included in input text image 10 obtained by performing a character recognition operation on input text image 10, or obtained from some other source, such as the word processing data structure which was used to produce input text image 10. Or binary data 70 may represent certain information about input text image 10, such as identifying information. For example, binary data 70 may represent character encoded information indicating the URL (Uniform Resources Locator) of a location on the World Wide Web, the graphical portion of the Internet communications network, where data related to input text image 10 may be found; such data may include: the image definition data structure of input text image 10 itself; a file containing the formatted data for display of input text image 10 on a computer using a browser program; a file from which input text image 10 was produced; a file containing a simple ASCII representation of the document from which input text image 10 was produced; or a file containing a simple, formatted ASCII version of input text image 10. In another example, binary data 70 may indicate attribute information about input text image 10, such as a time stamp indicating the version date and time of a word processing file from which input text image 10 was produced, or the date and time the iconic image was produced or printed, or any other date or time information that may be made available to the present invention during the process of producing the iconic image. Additional examples of attribute information include input text image owner identification information; a digital signature verifying the authenticity of the iconic image or of the data from which the iconic image was derived; and identification information about the printer on which the iconic image containing the encoded binary data was printed.

Binary data 70 may also indicate specific information related to a function or application with which the iconic image is associated or used. For example, the iconic image may be used as part of a system that controls authorized distribution or use of the full sized text image represented by the iconic image. An iconic image may contain encoded data indicating the functions that the possessor or viewer of the iconic image is authorized to perform with the full sized image. In another example, the iconic image may serve as part of a document indexing or browsing function or application. An iconic image of a table of contents or of a bibliography could provide identifying reference information, such as a hypertext reference, that would provide automatic access to a specific portion of a document or to a document referenced in the bibliography.

Finally, as will be discussed more fully below in the discussion of the encoding operation, binary data 70 may also include information generated by encoding operation 240 or 270 (FIG. 1) or by image reduction operation 260 or 250 (FIG. 1) or by some other operation that provides assistance to a decoding operation of the type illustrated in FIG. 17 and described below in the discussion accompanying FIG. 17. Such information might include cyclic redundancy check (CRC) data, error correction code (ECC) data, or information about the data being encoded, such as, for example, the number of lines of encoded data, the number of bytes of encoded data, or the number of encoded data blocks that are included in the iconic image.

Note that the examples provided of the type of information that may be represented by binary data 70 are not intended to be exhaustive or limiting in any manner. The present invention provides a technique for encoding and embedding, in the iconic version of an input text image, binary data representing any type of message.

3. Image position input data

In the present invention, another type of input data received by operation 200, in box 232 of FIG. 1, is data indicating image position data, referred to as image position input data, which is used to determine the image positions in the iconic image of the location of the encoded binary data. Generally, the encoded binary data appears in the iconic image in place of a reduced version of an original text region that appears in full size input text image 10 (FIG. 2), and image position input data is provided to operation 200 by another operation prior in time, or by a user of operation 200 as an input parameter. Depending on the particular implementation of the invention, image position input data may be the (x,y) coordinates of a bounding box in input text image 10 in which it has been determined that text appears. In this case, the location in the iconic image of this bounding box may be determined by image reduction operation 280 using the image position input data. Or, image position input data may be the (x,y) coordinates of the location in iconic image 20 (FIG. 2) where the encoded data is to be placed.

The (x,y) coordinates of the location of the encoded data in the iconic image or of the original text regions in input text image 10 that comprise the image position input data may be provided by the application that produced input text image 10, such as a word processing application, when operation 200 for producing the iconic image is performed in a document processing stream at a time when such information is available. Or the (x,y) coordinates may be provided by a user through a user interface that permits the user to mark the location of the original text regions in a displayed view of input text image 10 using a pointing device or a stylus.

In a fully automatic implementation of operation 200, image position input data may be the (x,y) coordinates of a bounding box in input text image 10 that is provided by an image segmentation operation performed on input text image 10. FIG. 4 schematically illustrates a representative output result of performing a known image segmentation operation on input text image 10. Segmented image 50 shows several image regions identified, illustrated in FIG. 4 as differently patterned rectangular blocks. Region 57 has been determined to be a non-text region containing a graphical object. Regions 56, 58 and 59 have been determined to include multiple lines of text. The bounding box coordinates of each of these regions, denoted as coordinate pair $((x^i_1, y^i_1), (x^i_2, y^i_2))$, where i indicates one of a sequence of text image regions in input text image 10, are provided to operation 200 as image position input data.

Regions 52, 53 and 54 have been identified as containing text, but image analysis operations on the pixels in these regions have determined that the regions do not contain multiple lines of text. The image segmentation operation also determines that the vertical height of these regions is larger than the vertical height of text regions that have been determined to include multiple lines of text, and so concludes that these text regions probably contain single lines of text, and may be heading regions. It may be preferable to avoid placing encoded data in an image region in the iconic image that represents a single, isolated line of text or that may contain text in the form of a heading because the encoded data in the form of rectangular blocks may be more conspicuous in these regions in the iconic image and may draw more attention to the encoded data.

Any suitable image segmentation operation may be used to provide coordinate data of bounding boxes of original text regions in input text image 10. The patent literature includes many such examples, and representative examples of patents that disclose image segmentation operations include several of which the inventor herein is the sole or a joint named inventor: U.S. Pat. No. 5,202,933, entitled "Segmentation of text and graphics"; U.S. Pat. No. 5,065,437, entitled "Identification and segmentation of finely textured and solid regions of binary images"; U.S. Pat. No. 5,131,049, entitled "Identification, characterization, and segmentation of halftone or stippled regions of binary images by growing a seed to a clipping mask"; U.S. Pat. No. 5,272,764, entitled "Detection of highlighted regions"; and U.S. Pat. No. 5,181,255, entitled "Segmentation of handwritten and machine printed text." U.S. Pat. Nos. 5,202,933 and 5,065,437 are hereby incorporated by reference for all that they teach.

4. Producing the iconic image version of an input text image

Returning now to the flowchart of operation 200 of FIG. 1, operations 240 and 260 or operations 250 and 270 use input text image 10, binary data 70, and image position input data to produce the iconic image having the embedded, encoded data of the present invention. The order in which the binary data encoding operation and the image reduction operation are performed depends on the details of a particular implementation; FIG. 1 shows two alternative processing orders. Binary data 70 (FIG. 3) may be encoded by binary data encoding operation 240 in a format that permits the rectangular blocks of encoded data, referred to as encoded data blocks, to fit within the dimensions of one or more text bounding boxes in input text image 10; the encoded data blocks may then be inserted into input text image 10, replacing the original text regions therein, to produce a full size intermediate image (not shown) and then image reduction operation 260 may produce the iconic image by reducing the dimensions of the full size intermediate image to the desired dimensions of iconic image 20. Alternatively, image reduction operation 250 may be performed to reduce input text image 10 first to the desired dimensions of the iconic image; the locations and dimensions of the original text regions can then be located in the iconic image (not shown), and these locations and dimensions used by binary data encoding operation 270 when encoding binary data 70 and positioning the encoded data blocks into the reduced intermediate version of input text image 10 to produce the final iconic image 20.

5. Printing or displaying the iconic image

Figure 5:
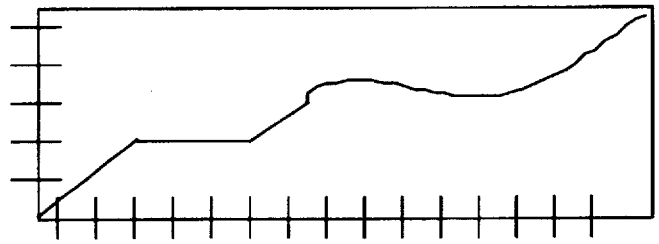
FIG. 5 illustrates a representative text image with the iconic version of the text image rendered as part of the image, illustrating a suitable use for the iconic image produced according to the present invention.
Figure 5:
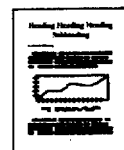
Figure 6:
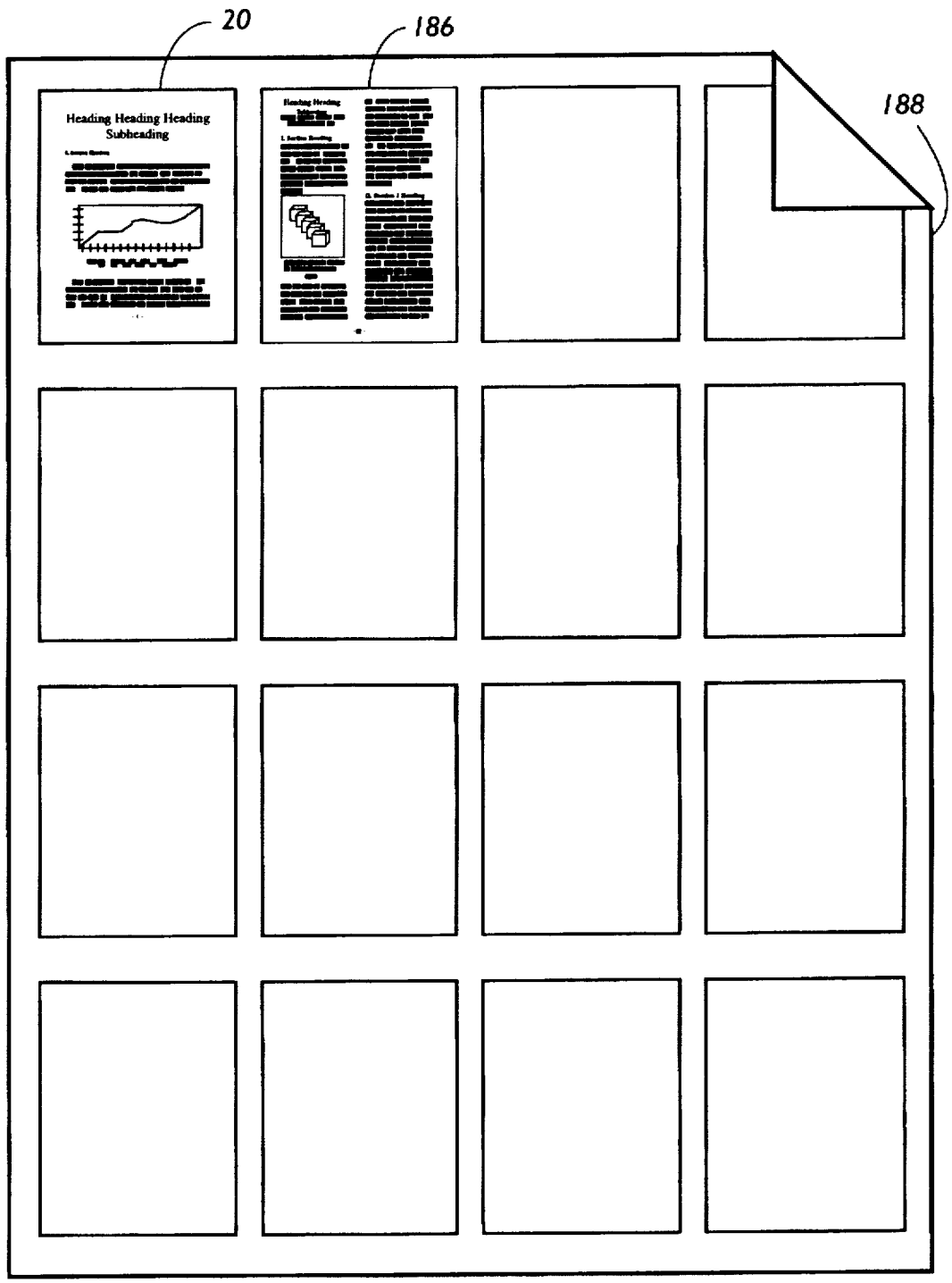
FIG. 6 illustrates a representative hardcopy text document showing several iconic images, illustrating another suitable use for the iconic image produced according to the present invention.
Figure 7:
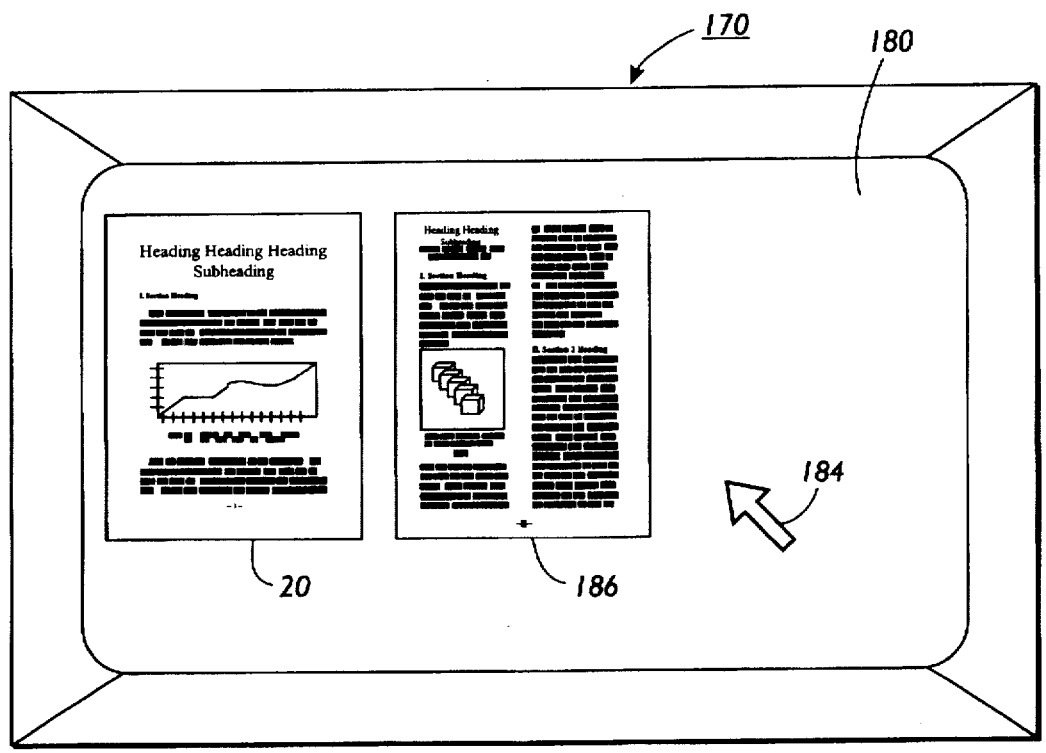
FIG. 7 illustrates the display area of a display device showing examples of iconic versions of text images, illustrating still another suitable use for the iconic image produced according to the present invention.

The iconic image produced according to operation 200 of the present invention may be stored in a file of such images, and may be printed or displayed in some manner, according to the functionality of a particular application. FIGS. 5, 6 and 7 illustrate some of the options for displaying and printing the iconic image. FIG. 5 illustrates output text image 182 with iconic image 20 printed in the lower margin of the document. This document image may be printed, and subsequent copies of the hardcopy printed document will carry iconic image 20 and the embedded data. FIG. 6 illustrates a hardcopy document page 188 with a collection of iconic images rendered on the page. Iconic images 20 and 186 in particular are shown in detail. When the encoded data in these iconic images indicate information about the respective full size version of the document the iconic image represents, this single hardcopy document can serve as a type of physical storage device for the information encoded in the documents represented; scanning this document and decoding the embedded data can provide the encoded data about the documents represented to a processor-controlled machine for further use. FIG. 7 presents still another use for the iconic images produced according to the present invention. FIG. 7 shows display device 170 with iconic images 20 and 186 displayed in display area 180. These images are available for direct manipulation by a user who is able to manipulate cursor 184 to select or otherwise interact with iconic images 20 and 186 using a direct manipulation device such as a mouse. Keyboard and stylus devices are also suitable direct interaction devices. In response to a user's interaction with iconic image 20 to carry out a request to perform a function, a decoding operation such as the one described below in the discussion accompanying FIG. 17 can extract and decode the embedded data, which may provide information with which to carry out the user's request.

B. Encoding Operations

Figure 8:
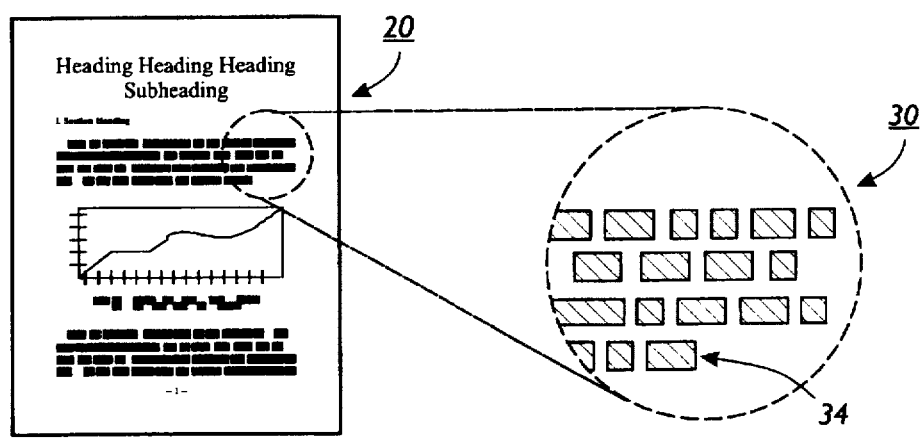
FIG. 8 illustrates an enlarged portion of the iconic image produced according to the present invention and showing encoded binary data in the form of rectangular data blocks.
Figure 9:
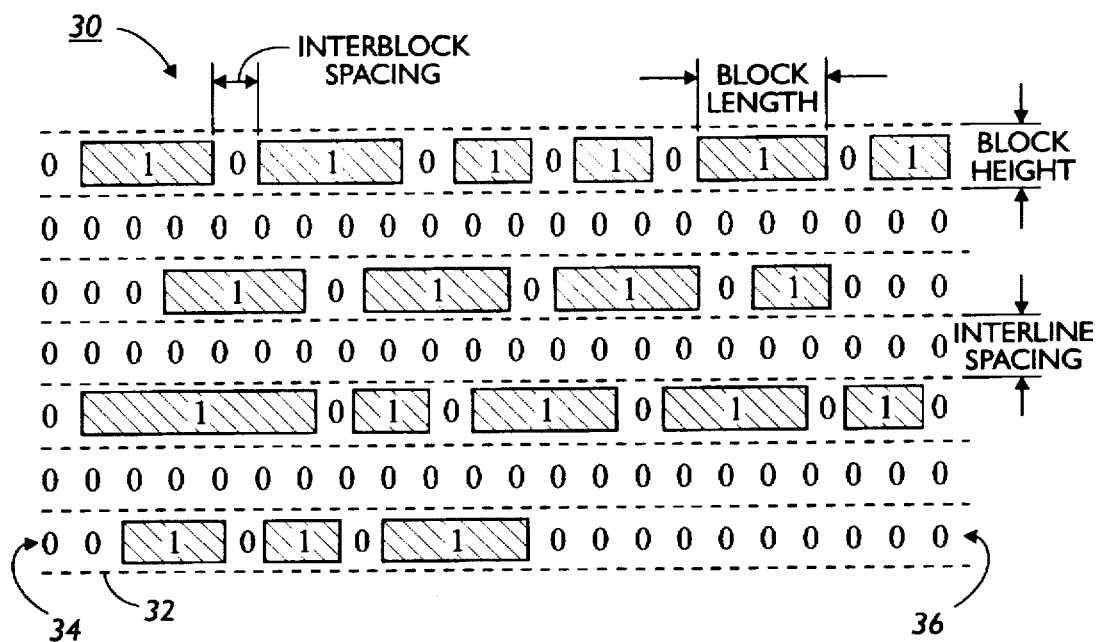
FIG. 9 schematically illustrates several characteristics and properties of the encoded data blocks shown enlarged in FIG. 8.

FIGS. 8 and 9 illustrate some general principles about the appearance of the encoded data produced by encoding operations 240 and 270 (FIG. 1). Binary encoding operations 240 and 270 map binary data of the type represented by binary data 70 in FIG. 3 to rectangular blocks, referred to as encoded data blocks, having certain appearance characteristics and features, generally called "display features," which may vary according to the application in which the iconic image is being used. The term "display feature" refers to any human perception produced by a display device, and includes a single display feature and also may include plural display features that together form a pattern of display features in an image. Thus, interblock spacing, block height, block length and interline spacing are all perceptible display features of the encoded data blocks. In the description that follows, reference will be made to characteristics and principles of binary encoding operation 270, but these characteristics and principles are equally applicable to producing encoded data blocks for input text image 10 according to binary data encoding operation 240. FIG. 8 shows iconic image 20 with portion 30 enlarged; portion 30 includes horizontally positioned, linear sequences of rectangular blocks. In general, binary data of the type shown by example in FIG. 3 and encoded in portion 30 of iconic image 20 is encoded into rectangular blocks having a foreground color; depending on the particular application for which the iconic image is to be used, the foreground color may be, but need not be, compatible with the foreground color of the text in the original text region that the rectangular blocks replace. FIG. 9 shows a more detailed view of portion 30. For each simulated line of text in the iconic image, a sequence of encoded data blocks containing encoded data are placed horizontally in the iconic image along a baseline such as baseline 32 and are horizontally spaced along the baseline by regions of background color, labeled in FIG. 9 as interblock spacing. In FIG. 9, the foreground color is represented as having a pixel value of "1" and the background color has a pixel value of "0", as is conventionally the case for representing black and white images. When an application's requirements demand that the encoded data blocks simulate text as closely as possible, interblock spacing should be roughly the same distance, or give the appearance of being roughly the same when the iconic image is printed or displayed, and the interline spacing should be proportional to the interline spacing in the original image. How faithfully the original text being replaced by the encoded data blocks needs to be simulated is a function of the needs of the application using the iconic image, and the blocks need not replace words and lines on a one-for-one basis. The height of each rectangular block, labeled as block height in FIG. 9, is generally proportional to other page layout dimensions in the iconic image, or to the height of the text in input text image 10; the block height may be uniform, as shown in FIG. 9, but need not be, if a suitable encoding operation is found that encodes data using the height dimension of the block. An encoding operation that uses the height feature for encoding is described below in the discussion accompanying FIGS. 15 and 16.

FIG. 9 shows the encoded data blocks as having varying block lengths. Generally, the length of the blocks should be somewhat random or at least vary in a pattern that gives the appearance of actual text in input text image 10. The characteristics of the word lengths in the language represented in input text image 10 may influence the selection of an encoding scheme, and an encoding scheme that produces an aesthetically pleasing pattern of encoded data blocks for replacing text in one language may not be particularly suited to representing text in a different language with markedly different word length characteristics.

A second stream of data may be encoded in the background color regions that serve as interblock spacing between the encoded data blocks by using different length background color regions. In the simplest encoding, one bit is encoded using short and long background color regions to separate encoded data blocks. The encoded bit can be used as "parity" for error detection on the previous encoded data block. A set of such bits can also be used for error detection or correction on the message that is encoded in the encoded data blocks.

In some encoding operations, the lines of encoded data blocks may need to be positioned so as to begin and end consistently at the same respective locations on a horizontal line; consistent line beginning positions, at the left margin, are generally expected in text documents, and are straightforward to implement. Consistent line ending positions for the encoded data blocks may be preferred when the text being replaced in input text image 10 is justified at the right margin. In addition, regardless of whether the text lines being replaced are justified at the right margin, simulating the last lines of paragraphs accurately may be important in some applications, such as, for example, when the iconic image is to be used as a surrogate for the original image and the display features of paragraph formatting are clues to the identity of the document represented. For example, it can be seen from FIG. 8 that the encoded data blocks of line 34 end before reaching the full length of line 34, approximately where the last line ends in the paragraph of text in input text image 10; in FIG. 9 it can be seen that the remainder of line 34 is filled with a run 36 of background color pixels. Thus, even if there is additional data to encode, the remainder of line 34 is left empty to simulate the abbreviated length of the last line of a paragraph.

To simulate both left and right text justification, each row (simulating a text line) of horizontally positioned encoded data blocks must have the same length. This is accomplished by using the regions of background color, referred to as interblock spacing in FIG. 9, that separate each encoded data block from the previous and succeeding blocks to adjust the positioning of the encoded data blocks placed on the line. The general procedure is as follows: position as many encoded data blocks in the sequence of blocks to be positioned as will fit on the line without exceeding the maximum line length, using a minimum allowed value of interblock spacing between each block; then increase the amount of interblock spacing between each block until the required line length is obtained.

An alternative procedure for producing equal length rows of blocks is to add an encoded data block to each line that has the width required to make the justification. This data block must be at a known (or computable) position in each line, so that the added block is able to be distinguished from the actual encoded data during a decoding operation. For example, the added block can always be the last block positioned in each full line of blocks. Note also that a combination of the techniques of adjusting the interblock spacing and adding a block to each line may be used to produce horizontal rows of encoded data blocks that have the same line length.

Figure 10:
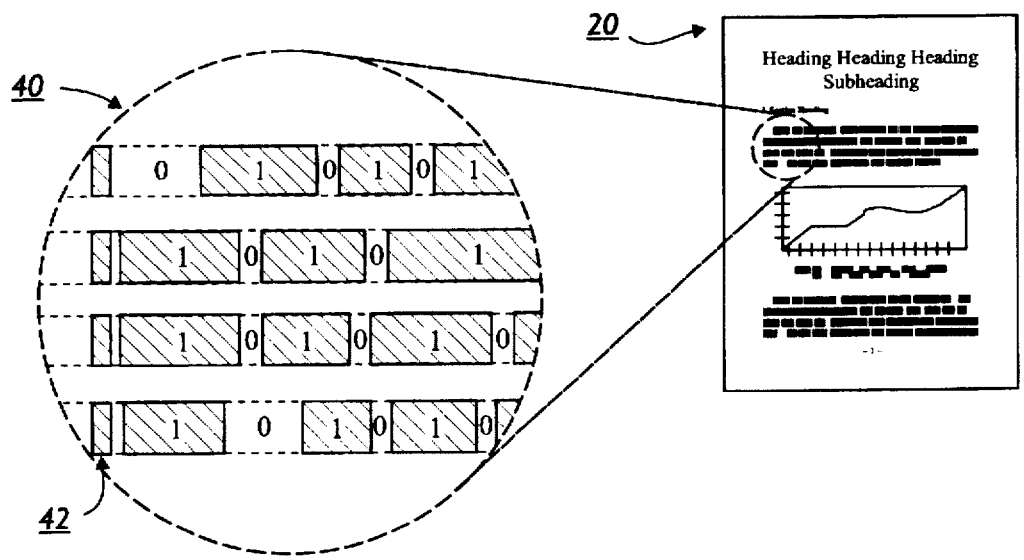
FIG. 10 illustrates another enlarged portion of the iconic image produced according to the present invention and showing special markers positioned at the beginning of horizontal rows of encoded data blocks.

In a variation of the general principles of encoding just described, special line-start or line-end markers may be inserted at the beginning or end, respectively, of each horizontal row of encoded data blocks in order to assist in the decoding process. Such markers may be some small number of pixels in width that make them clearly distinguishable from encoded data blocks; a width of two or three pixels is adequate to mark each row and yet does not produce marks in the iconic image "paragraphs" that are easily perceptible or distracting to a viewer of the iconic image. The markers may have the same height as the block height of the encoded data blocks so as to minimize the likelihood of their being noticed in the iconic image. FIG. 10 illustrates enlarged portion 40 of iconic image 20 showing line-start markers 42 at the beginning of each row of encoded data blocks.

Specific examples of encoding operations suitable for the present invention will now be discussed.

1. Encoding Operation Example 1

Figure 11:
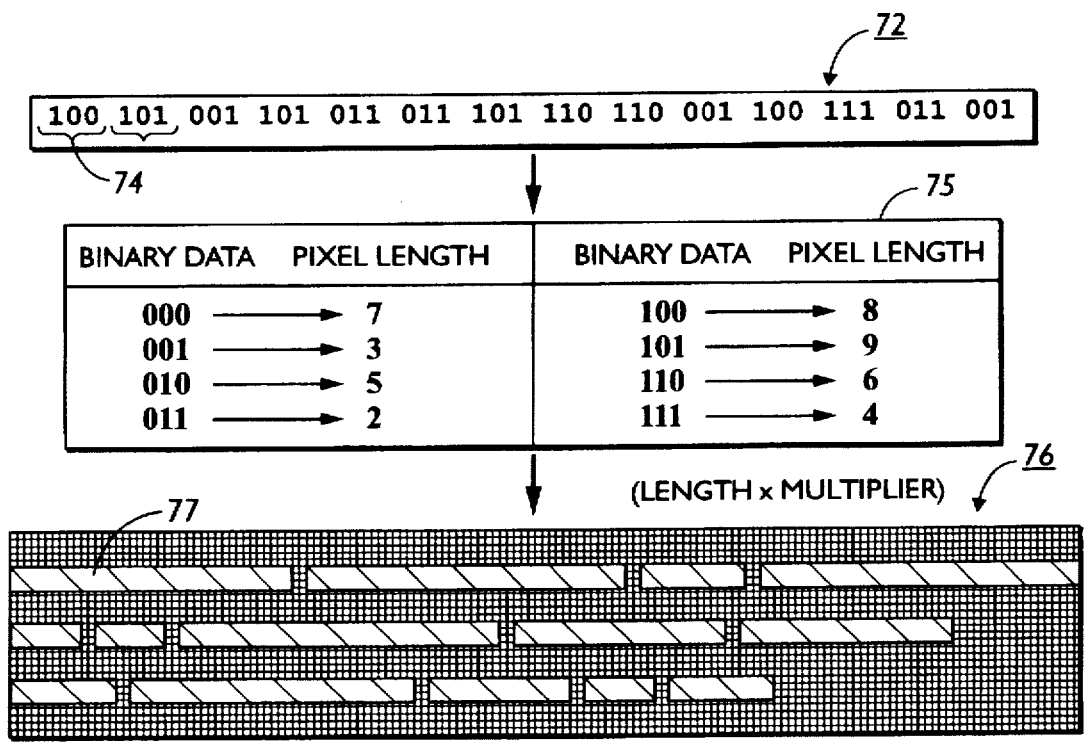
FIG. 11 illustrates an example of an encoding operation suitable for encoding the binary data of FIG. 3 according to the present invention.
Figure 12:
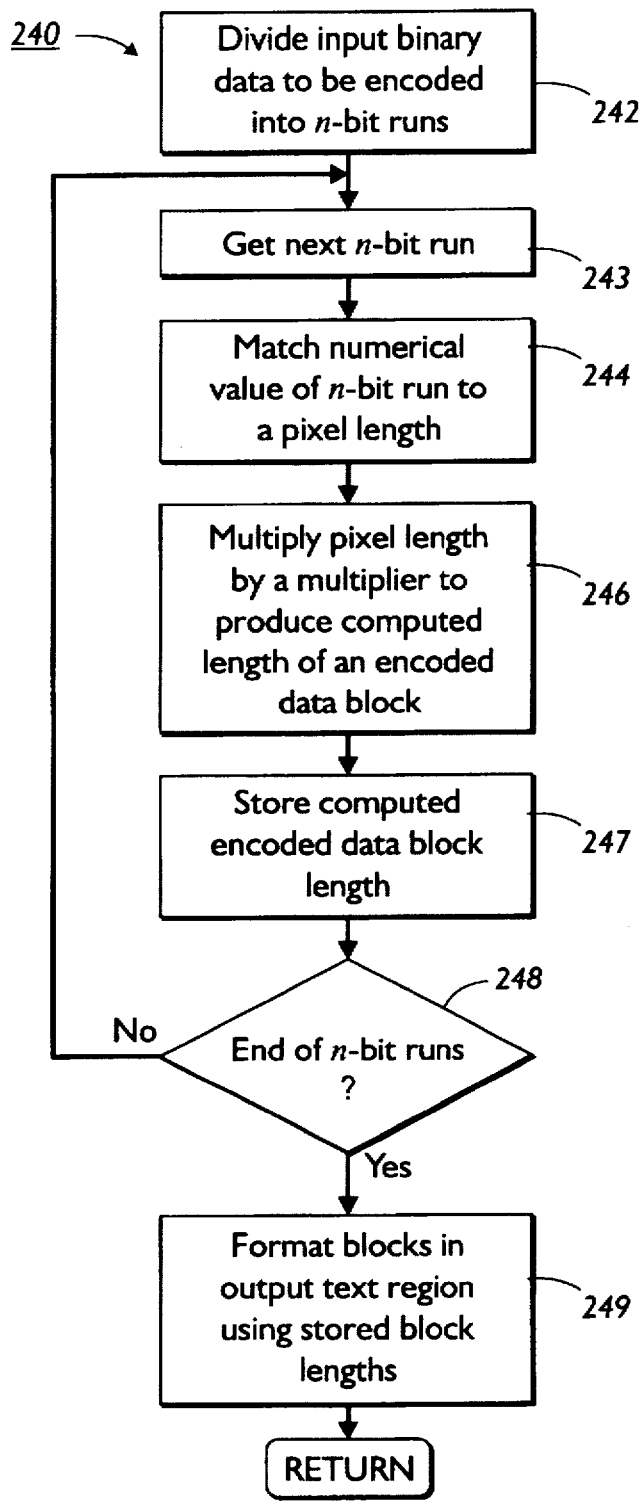
FIG. 12 is a flowchart illustrating the general operation of the example of the encoding operation illustrated in FIG. 11.

FIGS. 11 and 12 illustrate an example of an encoding operation that may be used to encode binary data 70 (FIG. 3) according to the present invention. FIG. 11 schematically illustrates the operation using portion 72 of binary data 70, and FIG. 12 is a flowchart of encoding operation 240. Note that either operation 240 or 270 of FIG. 1 may be implemented as shown in FIG. 12.

Encoding operation 240 starts by dividing, in box 242, binary data 70 into n-bit length sequences of binary data; FIG. 11 shows binary data 72 divided into 3-bit runs. For each n-bit sequence, the numerical value of the n-bit run is computed and matched, in box 244, to a pixel length in a lookup table 75. The pixel length is then multiplied by a constant multiplier, in box 246, to produce a computed pixel length for the encoded data block that is to represent this n-bit sequence of binary data in the iconic image. The multiplier is used to reduce errors during decoding, and may be a function of the magnitude of the reduction of the iconic image so as to ensure that the length of the encoded data blocks are proportional to the image region into which they are to be inserted. FIG. 11 shows pixel length values of 2 through 9 assigned to respective ones of the n-bit binary data, but these length values and their particular assignments to binary values are for illustrative purposes only, since it is clear to a person of skill in the art that a number of variations may be used. Image region 76 shows the encoded data blocks produced by encoding binary data 72 in 3-bit sequences using lookup table 75 and a multiplier of 5; each small square in image region 76 represents two pixels. Each encoded data block has a constant block height and is separated from the following encoded data block by a fixed size background color image region. Each block length produced from table 75 is multiplied by a multiplier of 5; for example, 3-bit binary data sequence 74 generates a pixel length of 8; encoded data block 77 shows a pixel length of 40.

Returning to FIG. 12, the computed lengths of the encoded data blocks are stored for further use, in box 247; and that after all binary data has been encoded, the blocks are formatted, in box 249, into horizontal lines at the appropriate block height and with appropriate interline spacing in the output text region of either the input text image or of the iconic image. Tests in operation 249 track when individual horizontal lines of encoded data blocks fill up, and when a text region fills up with multiple lines of encoded data blocks. Alternatively, encoded data blocks can be formatted and positioned in output text regions as they are encoded; operation 240 would then include the additional tests to track the formatting of the encoded data blocks into multiple lines in an output text region.

As just noted, the formatting operation 249 includes positioning the encoded data blocks in the output text region. If the encoded data blocks are to be formatted and positioned directly into the iconic image, the width of the horizontal lines of embedded data, the interline spacings, and the vertical height of the output text region must be computed according to the magnitude of the reduction of input text image 10. For example, if input text image 10 is the size of a conventional 8½ by 11 inch page, has been provided at a resolution of 300 dots per inch (dpi), the resolution of a conventional scanning device, and has a single column of text with one inch top, bottom and side margins, text lines are approximately 6½ inches wide and contain 1950 pixels. The vertical height in pixels of the maximum number of text lines on a page is approximately 2700 pixels. At an approximate 6× reduction rate, the iconic image will have a text region of approximately 300 pixels wide by 450 pixels in height, resulting in encoded data blocks that should average 30 pixels in length to position an average of 10 blocks per horizontal line, and 15 pixels on center vertically to position 30 horizontal lines of blocks with equal interline spacing between lines of blocks. These computations provide the rough dimensions from which to design an encoding scheme that produces encoded data blocks that simulate words in text lines. The encoding operation may be designed to accept the reduction magnitude as an input parameter and adjust the encoding scheme accordingly, using calculations of block length and interline spacing computed from the data analyzed from input text image 10.

2. Encoding Operation Example 2 a. Run-Length Limited Codes

The size of the iconic image and the regions available for encoding information necessarily limit the amount of information a single iconic image can carry, and some applications will require selection of a particularly efficient encoding scheme. General principles of information theory as applied to signal encoding can be used to evaluate the efficiency of a particular encoding scheme. In particular, evaluating run length limited (RLL) codes using known principles can aid in the selection of a reasonable RLL encoding scheme for a particular application of an iconic image in light of the type and quantity of information being encoded. In magnetic recording technology, RLL codes are characterized by the parameters [d, k] where d represents the minimum and k represents the maximum number of 0s between two consecutive 1s in a coded sequence of binary data. Since one of the goals of encoding data in the iconic image is to produce perceptible blocks in a foreground color, simply reversing the polarity of a selected RLL code produces length-limited runs of 1's each separated by a single zero, which consequently produce blocks of foreground color pixels separated by background color regions in the iconic image. Information on RLL encoding is found in numerous textbooks and articles on information theory, magnetic recording, and other related signal encoding topics. See, for example, *Magnetic Recording Volume II: Computer Data Storage*, C. D. Mee and E. D. Daniel, eds., McGraw-Hill Book Company, New York, 1988, Chapter 5. See also, Norris and Bloomberg, "Channel Capacity of Charge-Constrained Run-Length Limited Codes," *IEEE Transactions on Magnetics*, Vol. MAG-17, No. 6, November, 1981, pp. 3452–3455, (hereafter "the Norris and Bloomberg article") which is hereby incorporated by reference for all that it teaches.

Encoding operation example 1 maps fixed length input sequences of 3 bits into discrete runs of background color signals (that are perceived as the blocks in the iconic image) having variable length units (call each unit of length a "length unit") ranging from a minimum of 2 to a maximum of 9 length units, as shown in Table 75 of FIG. 11; in particular each 3 bit sequence is mapped into one of 8 run lengths. This type of encoding is a somewhat inefficient signal encoding scheme from the perspective of information-theory because all 8 lengths are generated with equal likelihood. Adding background color bits equal to a block-length increment to each encoded data block to represent the space between the blocks results in an average of 6.5 length units used for every 3 bits of input. The ratio 3/6.5, or 0.4615, is called the average channel rate, or how many bits of data are encoded per cell.

Encoding operation example 1, however, produces a varying range of block lengths that proves useful in the context of encoding data in place of text in an iconic image, since it is generally desirable to have the varying length blocks when trying to achieve the visual perception of text in the iconic image. Comparing the channel rate of encoding operation example 1 to the maximum theoretical channel capacity for a [2,9] RLL code that encodes 3-bit inputs, which is 0.5369, (found in the table in the Norris and Bloomberg article) it can be seen that a [2,9] RLL coding scheme would convert one input data bit into two message bits, which is a slightly better rate than the 3:6.5 ratio achieved in the encoding operation example 1. Similarly, the channel capacity of a [1,8] code is 0.6853, which allows implementations where two input data bits are converted into 3 message bits; a [1,8] code generates a message string that has at least one 1 and not more than 8 1's after each 0. Table 1 below summarizes this information for a selection of representative RLL encoding schemes that may be useful for certain iconic image applications; it is of course understood that these representative coding schemes are not exhaustive of all possible encoding operations that might be implemented in the context of the present invention.

TABLE 1

| Input Bit Sequence | [d, k] | Avg. Block length | Channel Rate | Theor. Max Channel Capacity |
|---|---|---|---|---|
| 2 bits | [1,4] | 2.5 + 1 = 3.5 | 2/3.5 = 0.571 | 0.62 |
| 3 bits | [1,8] | 4.5 + 1 = 5.5 | 3/5.5 = 0.546 | 0.69 |
| 3-bits | [2,9] | 5.5 + 1 = 6.5 | 3/6.5 = 0.462 | 0.54 |
| 4 bits | [2,17] | 9.5 + 1 = 10.5 | 4/10.5 = 0.381 | 0.55 | b. Encoding Operation Example 2: RLL Code [2,7]

Figures 13, 14:
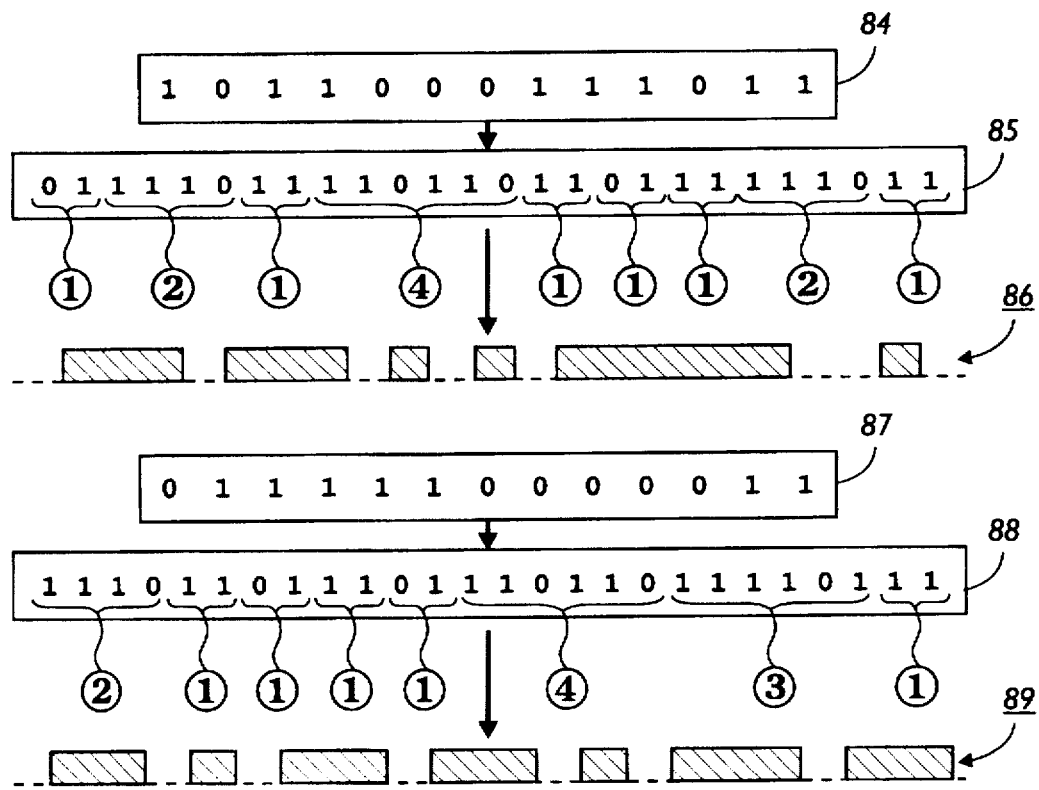
FIGS. 13 and 14 illustrate another example of an encoding operation suitable for encoding binary data according to the present invention.

FIGS. 13 and 14 illustrate a second encoding operation example that makes use of a [2,7] RLL code that encodes N input bits into one of a set of sequences of 2N output bits of both foreground and background colors, from which encoded data blocks are produced. The channel rate is thus ½ or 0.5. The theoretical maximum channel rate of this [2,7] code is 0.52. A [2,7] code generates runs of 1's with a minimum length of 2 and a maximum length of 7, with 0's limited to single occurrences. Table 80 in FIG. 13 shows the four possible input bit sequences and the respective message that each generates. The "x" in bit sequence 1 indicates that either a 1 or a 0 can be generated in that position, consistent with the run length limited constraint and the content of the prior message bit . The encoder generates one of the first three messages whenever a data "1" is encountered, and generates the fourth message whenever three 0s are encountered.

FIG. 14 shows an example of two sequences 84 and 87 of input binary data to be encoded according to the [2,7] code represented in Table 80, and their encoding in respective output message bit sequences 85 and 88. Each output message bit sequence generated by a portion of the input binary data has been marked with the reference number of the data in Table 80 of FIG. 13 in order to show how the output message bit sequence was generated. Note that there are exactly two message bits generated for every input data bit. Thus, the channel rate is 0.5. The horizontal rows 86 and 89 of encoded data blocks produced by the respective output message bit sequences illustrate that the encoding scheme is suitable for generating rectangular blocks for replacing text regions in an iconic image.

3. Encoding Operation Example 3

Figure 15:
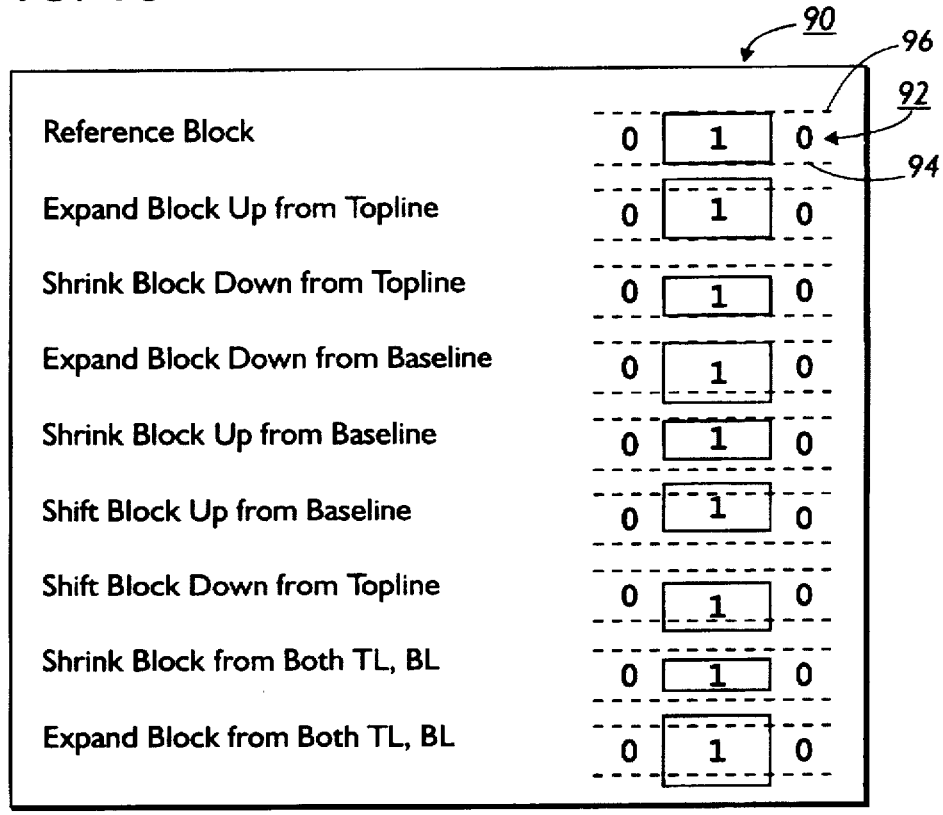
FIG. 15 illustrates a third example of a suitable encoding operation for use in the present invention that encodes binary data in the height and vertical positions of rectangular data blocks.
Figure 16:
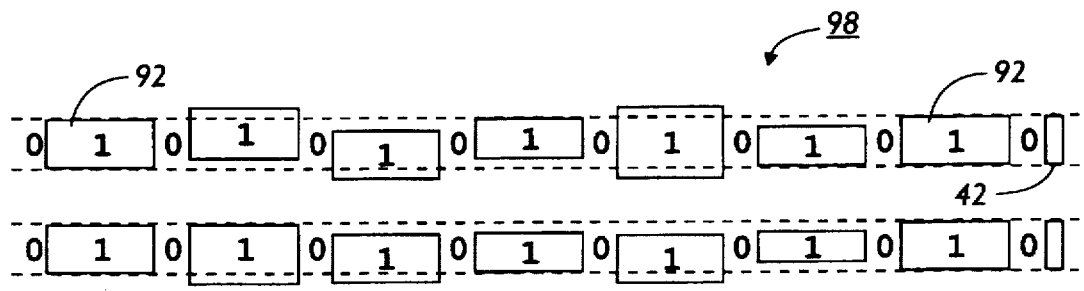
FIG. 16 illustrates exemplary rows of encoded data blocks encoded according to the encoding operation example of FIG. 15.

A channel of information (i.e., message) may also be encoded in the height and vertical position of the encoded data blocks, in addition to, or in place of encoding binary data in varying-length rectangular blocks. Table 90 in FIG. 15 illustrates several examples of positions and heights that may be used to encode binary data. Table entry 92 illustrates a reference block having a reference topline 96 and a reference baseline 94. The dashed lines shown in each of the other examples, although not labeled, are the same reference topline and baseline, with the rectangular block altered in each example with respect to one or both of those reference points. Each example is labeled with its respective alteration, and abbreviations "TL" and "BL" refer to topline and baseline, respectively. The eight positions in Table 90 plus the reference block provide sufficient variation to encode the fixed-length 3-bit input data sequences encoded in Example 1 above and illustrated in FIG. 11 that generate 8 different values. When only height and position encoding is used, the block lengths may remain uniform, as shown in Table 90. However, an additional 3 bits of information may be encoded in each encoded data block, for a total of 6 bits per block, by varying the width of each encoded data block as illustrated in encoding operation example 1, in addition to the vertical position and height encoding illustrated in FIG. 15. FIG. 16 illustrates two rows 98 of encoded data blocks carrying height and vertical position encoding and having uniform block lengths.

For decoding purposes, a reference topline and baseline must be established in at least one row, and preferably all rows, of blocks in a region. Two techniques for encoding a reference baseline and topline in each line are suggested: the line-start or line-end markers, when used, may be specifically added to lines of encoded data blocks at the reference baseline or topline position, or may establish both positions;

or one or two special-purpose encoded data blocks may be added in each line that have a fixed, reference height. For example, the first and/or last encoded data block in each line can have fixed top and bottom raster positions that provide the reference for top and bottom lines in all blocks for that line. FIG. 16 illustrates each row of blocks having an end-of-line marker 42, and first and last blocks as being reference blocks 92.

C. Decoding an Iconic Image

Decoding the message of binary data 70 from iconic image 20 involves two broad operations: identification of the region or regions in the iconic image that contain the encoded data blocks, and decoding of the message from the blocks. These broad operations are the same regardless of whether the iconic image to be encoded is provided by a scanning operation that converts a physical document on which the iconic image is rendered to digital data, or is provided as an original electronic image in the form in which it was encoded. However, particular details of locating the encoded data blocks may be implemented differently for iconic images in their original electronic form and that have not been previously scanned or are not provided by a scanning operation, since image processing operations designed to account for the noise introduced by the scanning operation would not necessarily be required. In addition, the electronic form of the iconic image may contain the regions of encoded data blocks as rectangles.

The following description of a decoding operation is made with reference to decoding encoded data blocks that carry the binary message in a variation of their lengths, and not in their heights, and include operations that account for noise introduced by the image capture process. A brief discussion then follows of the different considerations needed in decoding encoded data blocks that carry the binary message in a variation of height.

1. Finding image regions of encoded data blocks

Figure 17:
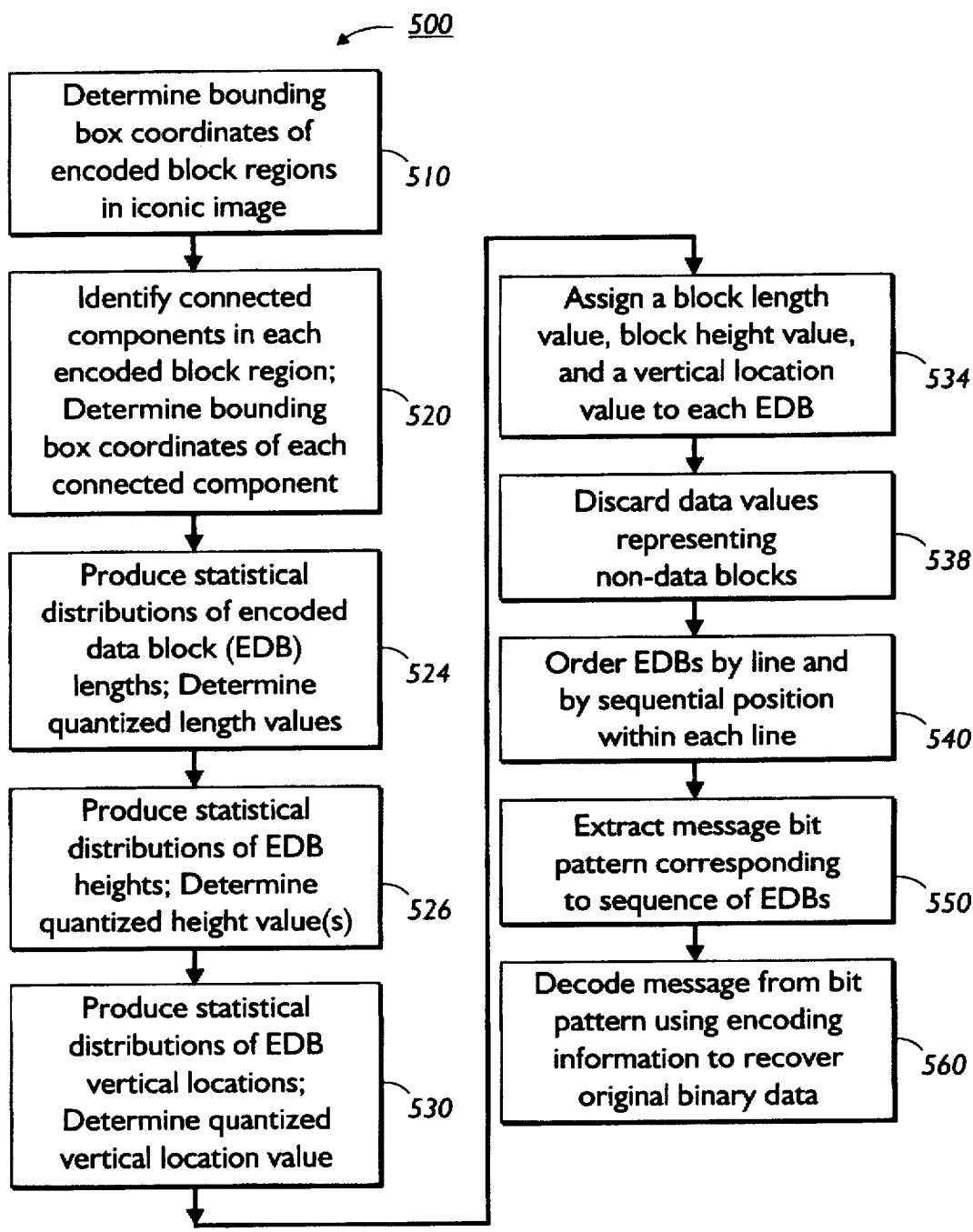
FIG. 17 is a flowchart illustrating the general operation of the decoding operation of the present invention.

FIG. 17 provides a general flowchart of decoding operation 500. An input image to be decoded has regions of encoded data blocks located within it, but in many applications of iconic images these locations are not likely to be known in advance. A region in iconic image 20 that is composed of horizontal rows of elongated rectangular blocks, each of which has approximately the same height will be referred to hereafter as an encoded block region.

Standard image processing operations may be used, in box 510, to reliably locate the bounding box coordinates of the encoded block regions in an input image. By way of example, the following process may be used, but other image processing operations may also be suitable. This process assumes that each encoded data block—also referred to in this discussion as an EDB—has approximately the same height, and that this height is known. The beginning or ends of these lines may be composed of specific "line-start/line-end" markers that are all of an identical shape, distinguishable from the blocks. Location of the encoded block regions can be done in two steps. In the first step, image-based morphological operations can be used to locate likely candidates for these regions. In the second step, the candidates are evaluated to see if they conform to the expected shapes.

Morphological operations map a source image onto a destination image according to a rule defined by a pixel pattern called a structuring element (SE). The SE is defined by a center location and a number of pixel locations, each having a defined value (ON or OFF). Other pixel positions, referred to as "don't care," are ignored. The pixels defining the SE do not have to be adjacent to each other. The center location need not be at the geometrical center of the pattern; indeed it need not even be inside the pattern. By way of background, several common morphological operations operate as follows: "Erosion" is a morphological operation wherein a given pixel in the destination image is turned ON if and only if the result of superimposing the SE center on the corresponding pixel location in the source image results in a match between all ON pixels in the SE and the underlying pixels in the source image. "Dilation" is a morphological operation wherein a given pixel in the source image being ON causes the SE to be written into the destination image with the SE center at the corresponding location in the destination image. An SE used for dilation typically has no OFF pixels. "Opening" is a morphological operation that consists of an erosion followed by a dilation. The result is to replicate the ON pixels in the SE in the destination image for each match of the ON pixels in the source image. "Closing" is a morphological operation consisting of a dilation followed by an erosion. For opening and closing, the result does not depend on the center location of the SE since each operation includes successive complementary operations with the same SE. Information about morphological image processing is available in a number of texts and articles. For example, image-based approaches to document image analysis based on image shape and texture properties are described in D. S. Bloomberg, "Multiresolution morphological analysis of document images", *SPIE Conf.* 1818, *Visual Communications and Image Processing '92*, Boston, Mass., November 1992, pp. 648–662, which is hereby incorporated herein by reference as if set out in full.

The morphological operations used to locate encoded block regions comprise two filtering operations: first, a morphological closing with a small horizontal structuring element is used on the input image to produce a resulting image, referred to as R1; this operation will cause the EDBs to horizontally merge, forming thin horizontal lines in R1. Then, a hit-miss structuring element is used on R1 to locate these thin horizontal lines; that is, the hit-miss structuring element projects out of the R1 image where the thin horizontal lines are located. The hit-miss structuring element would typically be of a form such as element 512 shown in FIG. 18. This is a filter that is placed, in effect, at every possible location on (or over) the R1 image. At each location in the R1 image, the result is either a match with SE 512 or no match. If a match is found, an ON pixel is written at this location in a resulting R2 image; otherwise a 0 pixel is written in the R2 image. Thus the result of the operation is to produce a binary image, R2, with ON pixels wherever filter 512 matches at a location in the R1 image and OFF pixels elsewhere. The conditions for a match between filter 512 and a location on the R1 image are (1) all pixels in the R1 image "below" the 1 values in filter 512 must be ON and (2) all pixels in the R1 image below the 2s in filter 512 must be OFF. The pixels below the 0s are not tested. This filter is well-suited to finding horizontal lines that are about 5 pixels wide. The horizontal extension of the filter should be long enough to eliminate accidental matches from most elements of the image that are not joined or merged EDBs.

Figure 18:
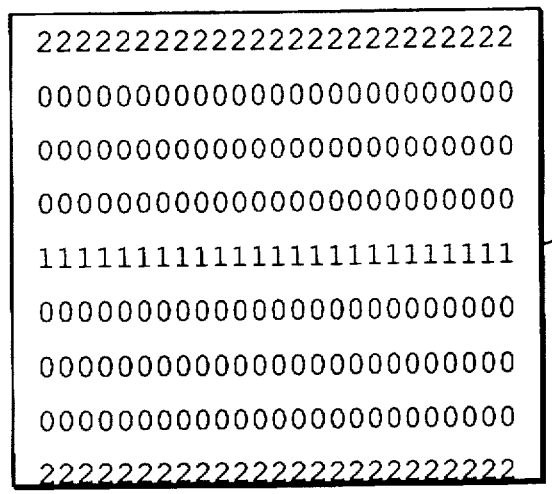
FIG. 18 illustrates a structuring element used in a morphological operation to identify encoded blocks in an iconic image, according to the decoding operation illustrated in FIG. 17.

The hit-miss operation is then followed by a dilation operation performed on resulting image R2 using the ON pixels of structuring element 512 (FIG. 18). This operation expands the horizontal lines to be approximately the same length they were in R1, the output of the closing operation. The dilation operation produces resulting image R3.

Resulting image R3 will contain a set of thin horizontal lines that potentially mark the locations of the EDBs; additionally, there may be a few other places in R3 with ON pixels. Then, a morphological closing operation is used with a small vertical structuring element, large enough to join the horizontal lines; this operation will solidify the thin horizontal lines into a block of ON pixels, while having relatively little effect on the other ON pixels which will remain scattered. The resulting image R4 produced by the morphological closing operation can then be searched for these blocks of solid ON pixels that are candidates for the encoded block regions containing the encoded data blocks. A common method is to look for bounding boxes of connected components, and to select only those bounding boxes that are sufficiently large, thus eliminating the "noise" pixels.

Once the candidate bounding boxes have been located, a verification operation is needed to ensure that encoded data blocks have been identified correctly. Using the original input image being decoded, in each region identified in the first step, the connected components in the original image are found and their sizes and locations are analyzed. (The definition of a connected component is provided below.) This analysis includes determining whether the connected components are all about the same height and have widths that vary between expected limits. One way in which this may be accomplished is to take the bounding box around each connected component and shrink it by two pixels in each direction, to produce a smaller bounding box. When a connected component is an encoded data block, this reduced-size bounding box has eliminated the most common variabilities introduced by scanning noise and should be a solid rectangular block of foreground color pixels. In addition, this analysis should determine whether the connected components are organized in a two-dimensional pattern, with parallel components laid out as if they were sitting on parallel horizontal lines. Another useful piece of analytical information is to produce the variance of the horizontal and vertical run lengths in each connected component; the less variance found in each block, the more likely it can be concluded that a candidate region is an encoded data region, since text regions that have been reduced and not replaced with the regular encoded data blocks are likely to show more variance in the vertical and horizontal run lengths of the connected components. Various histogram techniques may be used to develop the data needed for this analysis. It is also useful to extract the median length (or height, if height encoding is used) from the data developed during the variance analysis; as will be seen below, the median value may be used to assign a data value to each block for purposes of decoding.

The verification process may include locating the beginning or end of line markers. As noted previously, the beginning or end of the horizontal rows of encoded data blocks may be encoded with specific line-start or line-end markers that are all of an identical shape, such as line-start markers 42 shown in FIG. 10. These markers are designed to be easily distinguishable from the encoded data blocks, and make detection of the region in iconic image 20 that contains the encoded data a more straightforward operation.

2. Assigning quantized values to the encoded data blocks using histogram analyses Once the bounding box of each encoded block region is determined, the operation of decoding the binary data from the blocks within each bounding box follows next. The regions verified to contain EDBs can be extracted from the image (i.e., copied to another image) for further analysis and for decoding the information from each region individually. The size and position of each encoded data block in an encoded block region needs to be determined in order to decode the message embedded in the region.

Connected components are identified in each encoded block region, in box 520 of FIG. 17, and the bounding boxes of each connected component is determined. For purposes of establishing a common terminology framework for discussing the present invention, image locations such as pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used. An "edge" occurs in an image when two neighboring pixels have sufficiently different pixel values according to an appropriate criterion for the occurrence of an edge between them. The term "edge pixel" may be applied to one or both of two neighboring pixels between which an edge occurs. A set of pixels in an image is "connected" if each pixel has at least one neighboring pixel that is in the set and if each pair of pixels in the set are connected by a subset of other pixels in the set. One or more connected set of pixels bounded by an edge may be called a "connected component".

Each connected component roughly represents an encoded data block, but for decoding purposes, much more accurate information is needed about the size of each block. In particular, statistical data are collected about each encoded data block for the purpose of assigning a block length, block height and vertical "baseline" position to each block. The statistical data to be collected includes the distribution of block lengths, block heights and vertical locations of the blocks, all in units of pixels. These distributions are typically presented in the form of histograms. Data indicates a "distribution" of an image characteristic when it has a value that depends on a number of measurements of the image characteristic. For example, data can indicate a distribution of distances or of measurements of another scalar quantity by indicating the central value of the measured distances; a measure of the variance of the measured distances; or a measure combining the central value and variance. Data can also indicate a distribution of distances by indicating frequency of each distance or by indicating distances at which maxima of frequency occur. A "histogram" is data that indicates a distribution of an image characteristic by indicating frequency of occurrence of the values of the image characteristic. For example, if an image characteristic is measured over a range of magnitude or size, a histogram can indicate frequency as a function of the magnitude or size. The range can be divided into parts and the histogram can indicate the number of measurements occurring in each part. Thus a histogram can be used to find maxima of frequency, for example.

The lengths of the encoded data blocks are measured, in box 524, using the bounding box of the connected components; this type of measurement is likely to produce a distribution of lengths that center around certain prominent length values, called "quantized" lengths, with a variation of only a few pixels between the quantized lengths. For a more accurate measurement, the length and location of each pixel row is used to determine the median row length for the block, and a variance of the median row length measurement is also developed. In order to develop this more accurate measurement, the short run lengths in each connected component must be eliminated. These short run lengths are runs that do not extend the full length of an encoded data block as a result of noise introduced by the scanning operation. Three methods can be used to accomplish this: one or more pixel rows near the top and bottom of each connected component may be discarded; or runs of foreground color pixels having a length less than a small value shorter than the longest run may be eliminated; or both of these conditions may be implemented.

This measurement process also produces a distribution of lengths that center around quantized block lengths. The accuracy (or reliability) of this measurement is inversely related to the size of the variance in the measurements. The best values for each quantized length to be assigned to encoded data blocks are then determined from this distribution data. This is typically done by taking the median size for those measurements determined to be from blocks at each row length.

Quantized values of the block heights and the vertical locations (i.e., a "baseline" position of a row of encoded data blocks) of the rows of encoded data blocks are developed in a manner similar to that of the block lengths, in boxes 526 and 530 of FIG. 17, since the uniform and regular placement of the rectangular blocks during encoding suggest that these values are expected to differ by only one or two pixels between blocks. To measure the block heights and vertical locations most accurately, each pixel column in a connected component is measured, and the median and variance are then used to determine the data value and its reliability. Pixel columns near the left and right edges are discarded because they may not extend the full height, again resulting from the introduction of scanner noise. Again, the best value(s) for quantized block height(s) are determined. For encoded data blocks that have been encoded having the same block height, a single quantized block height level is expected.

3. Decoding the message from the quantized data values

These quantized values are then used to assign data values indicating the quantized length, height, and vertical block position of each block, in box 534. The values of data blocks that do not contain encoded data, such as blocks that are added to give line justification, are discarded, in box 538, from the data to be used to extract the encoded message. The values assigned to the encoded data blocks are then ordered, in box 540, as the encoded data blocks are ordered in the encoded block region—by line and by sequential position within each line. These ordered values of lengths of foreground colors and their positions provide the message bit pattern of 0's and 1's from which the data message can be decoded; this message bit pattern is then produced in box 550. Finally, the data message is decoded from the extracted message bit pattern, in box 560, using formatting information about the encoding operation.

The format of the encoding operation specifies whether there is parity or other error correction code data, as well as whether there is "meta-data" about the message, such as the number of bytes in the encoded message or the number of encoded "text" lines in the iconic image, or other information about the encoding format or about the encoded message. Some aspects of the formatting must be known a priori; while others can be determined from the data. For example, the data encoded in the height and vertical location of the blocks can be known to specify meta-data—that is, data about the message, such as the amount and type of ECC that has been appended. This formatting information is used to identify and verify the bits that carry the data message; these bits can then be decoded; in many cases, a lookup table of selected, or of all possible, bit patterns with corresponding decoded data bits, may be used to complete the decoding operation.

Figure 19:
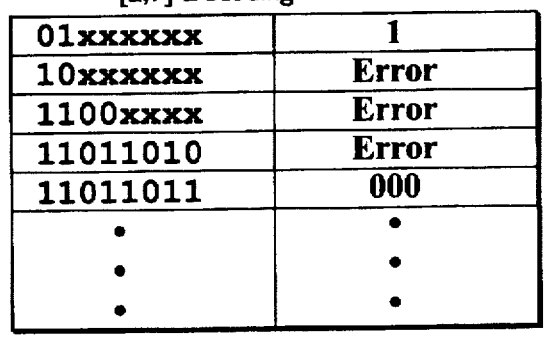
FIG. 19 illustrates a lookup table that may be used to decode data encoded according to the encoding example of FIGS. 13 and 14, in the decoding operation illustrated in FIG. 17.

In the case of the [2,7] RLL code in encoding operation example 2, for example, a table such as Table 546 in FIG. 19 can be prepared of all possible 8-bit sequences of 0's and 1's, with the output message bit sequence entered for valid 8-bit sequences. Decoding then proceeds by taking an 8-bit wide sliding window over the message and looking up the 8-bit message in the table. When a valid N-bit output message is found in the table, the sliding window advances 2N bits downward in the message.

In the case of encoding operation example 1, illustrated in FIG. 11, the data values assigned to the connected components, and specifically the length values of the blocks, when read in horizontal row position order within vertical block position order, provide a message bit pattern of 1's from which the encoded message may be directly extracted, since each encoded data block contains an individual and discrete portion (i.e., 3 bits) of the binary data; each block is decoded by looking up its raw length (produced by dividing by the multiplier) in a table of lengths similar to table 75 in FIG. 11 to obtain the corresponding 3-bit pattern represented by the length. The extracted sequences of bits are then concatenated to produce the encoded message.

In order to decode a message encoded in the heights and vertical positions of the encoded data blocks rather than in their lengths, as illustrated in FIGS. 15 and 16, the decoding steps of FIG. 17 are essentially carried out in the same manner, with the additional step of establishing a reference baseline and topline for each horizontal line of connected components, in order to then determine the amount of shift above or below these reference points during decoding Thus, each line of connected components is assigned a reference baseline and topline when data values are assigned to each connected component in box 534. Decoding then proceeds as illustrated in FIG. 17: a message bit pattern can be determined from the height values as ordered by encoded data block and their respective displacements from the reference baseline and topline in each line. The data message can then be decoded from the extracted message bit pattern.

As noted during the encoding discussion above, reference baseline and topline positions must be specifically encoded. Two techniques were suggested in the discussion accompanying FIG. 16 above: the line-start or line-end markers, when used, may be specifically added to lines of encoded data blocks at the reference baseline or topline position, or may establish both positions; or one or two special-purpose EDBs may be added in each line that have a fixed, reference height. For example, the first and last EDB in each line can have fixed top and bottom raster positions that provide the reference for top and bottom lines in all EDB for that line. A combination of fixed position encoded data blocks and line-start or line-end markers may also be used to mark the reference topline and baseline. The decoding operation can take advantage of this information, if it is known in advance, or the reference blocks can be detected using image processing operations.

D. The Machine Environment of the Invention

Figure 20:
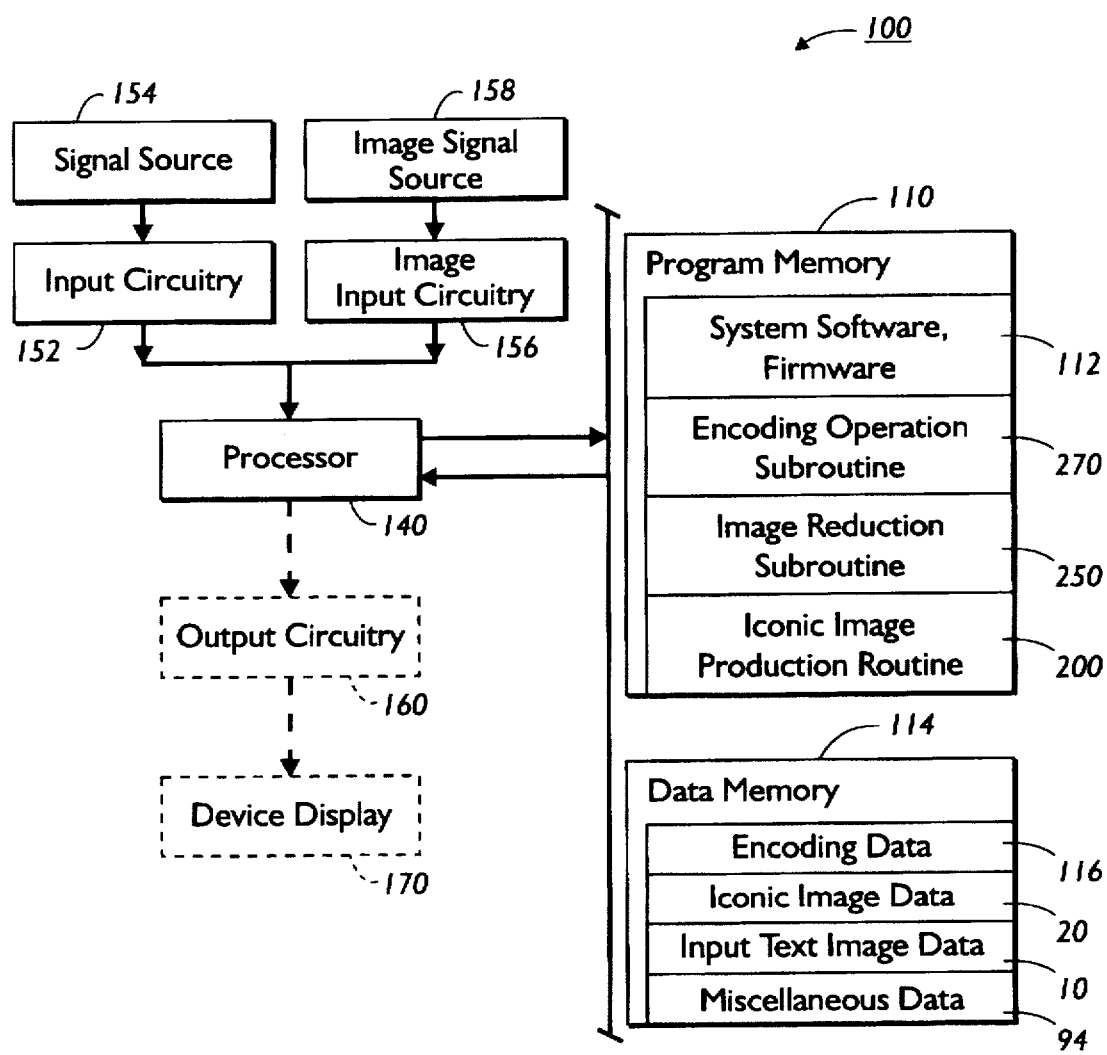
FIG. 20 is a simplified block diagram illustrating a machine in which the present invention may be used.

FIG. 20 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed and optimized for the purpose of carrying out the invention, or it may comprise a general purpose computer selectively activated or reconfigured by a computer program stored in the computer, or it may be a combination of a general purpose computer and auxiliary special purpose hardware. When a machine such as machine 100 is suitably programmed to embody the present invention, the machine is not a standard or known configuration.

The input text image 10 that is input to the present invention is provided from either signal source 154 or an image signal source 158. Image signal source 158 may be any image capture device, such as a scanning device, a digital camera, or an interface device that produces a digital image definition data structure from another type of image signal. An input text image such as image 10 in FIG. 2 provided by image signal source 158 is forwarded via image input circuitry 156 to processor 140 and may be stored in data memory 114.

Machine 100 also includes input circuitry 152 for receiving signals from a signal source 154. Such sources include signals from another processor performing an operation, or signals from a memory device. Signal source 152 may also include user interaction devices controllable by a human user that produce signals in response to actions by the user, such as a pointing device or a keyboard. Another type of user interaction device is a stylus device that the user moves over a special data collecting surface, which might be the display area of a display device (not shown). These input signals are also forwarded via input circuitry 152 to processor 140 and may be stored in data memory 114. Machine 100 may, but need not, include a conventional display device 170 capable of presenting images, such as a cathode ray tube, a liquid crystal display (LCD) device, a printing device, or any other device suitable for presenting images.

Processor 140 operates by accessing program memory 110 to retrieve instructions, which it then executes. Program memory 110 includes iconic image production instructions 200 that implement the functions shown in flowchart 200 of FIG. 1. Program memory 110 includes instructions for the subroutines needed to produce the iconic image version of an original text image according to iconic image production instructions 200. During execution of the instructions, processor 140 may access data memory 114 to obtain or store data necessary for performing its operations. Data memory 114 stores the image definition data structure 10 defining the original input image as well as the image definition data structure 20 defining the iconic image version. Data memory 114 also stores the binary data 80 to be encoded and the input image position data which is used to determine where in the iconic image the encoded data is to be placed. Data memory 114 also stores various other miscellaneous data.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.)

E. The Software Product of the Invention

Figure 21:
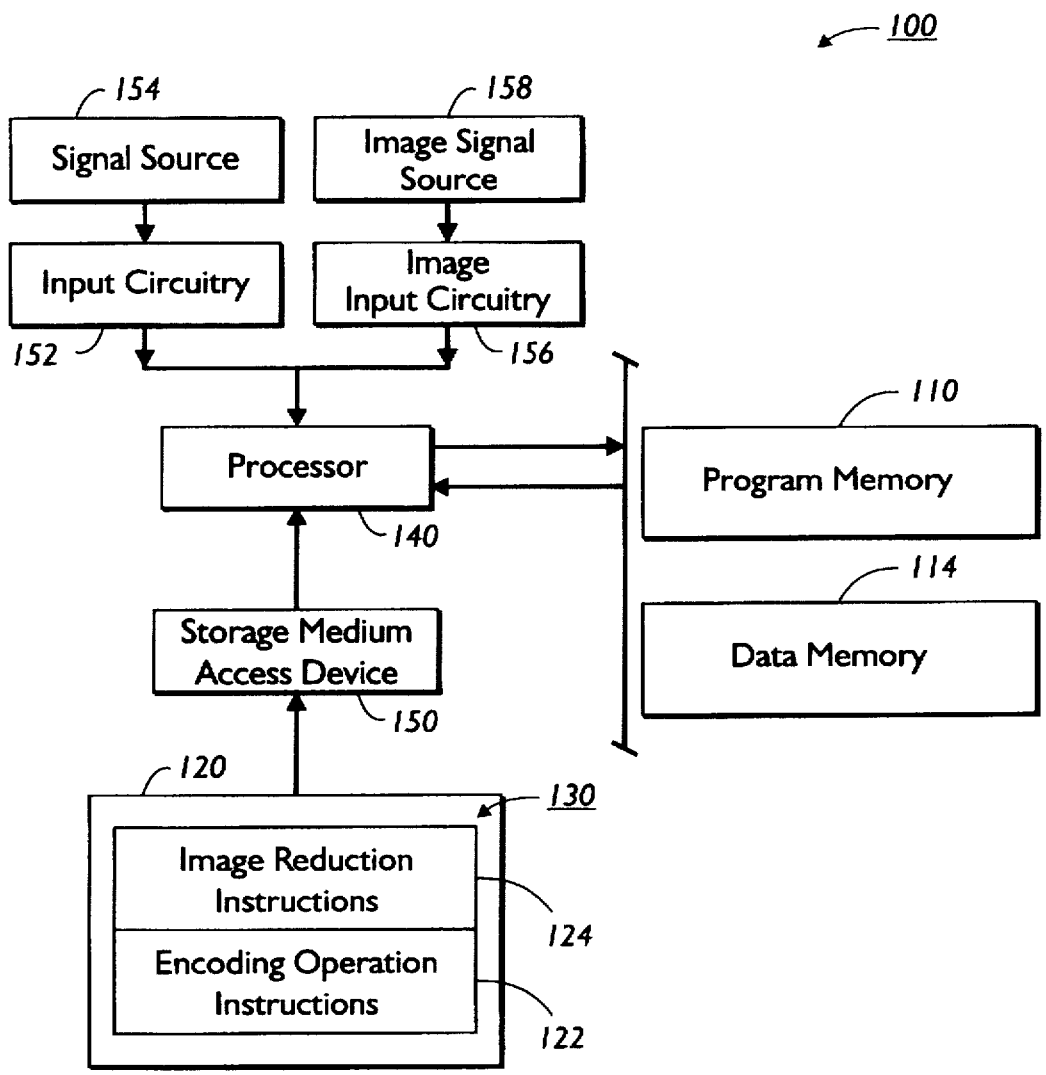
FIG. 21 is a block diagram schematically illustrating the software product of the present invention and its use in conjunction with a suitably configured machine.

FIG. 21 shows software product 120, an article of manufacture that can be used in a machine that includes components like those shown included in machine 100. Software product 120 includes data storage medium 130 that can be accessed by storage medium access circuitry 150. Data storage medium 130 stores instructions for executing the method of the present invention for producing an iconic image version of an original input text image, as illustrated in FIG. 1, and may include instructions for performing the method according to one of the illustrated embodiments of the invention illustrated in the flowchart of FIG. 12, or in the schematic diagrams of FIGS. 13 and 14 or 15–16.

Software product 120 may be commercially available to a consumer in the form of a shrink-wrap package that includes data storage medium 130 and appropriate documentation describing the product. In that case, a data storage medium is a physical medium that stores instruction data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which data storage medium 130 is inserted in order for the storage medium access circuitry to access the data stored thereon. Examples of storage medium access devices include disk drives and CD-ROM readers. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 130 when data storage medium 130 is stored as part of a remotely-located storage device, such as a server. Software product 120 may be commercially or otherwise available to a user in the form of a data stream indicating instruction data for performing the method of the present invention that is transmitted to the user over a communications facility from the remotely-located storage device. In the latter case, article 120 is embodied in physical form as signals stored on the remotely-located storage device; the user purchases or accesses a copy of the contents of data storage medium 130 containing instructions for performing the present invention, but typically does not purchase or acquire any rights in the actual remotely-located storage device. When software product 120 is provided in the form of a data stream transmitted to the user over a communications facility from the remotely-located storage device, instruction data stored on data storage medium 130 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

Data storage medium 130 stores instruction data which is provided to processor 140 for execution when the method for producing an iconic image version is to be used. The stored data includes binary data encoding instructions 122; when these instructions are provided to processor 140, and processor 140 executes them, the machine is operated to perform the operations for encoding binary data into rectangular encoded data blocks, as represented in boxes 240 and 270 of FIG. 1.

The stored data further include image reduction instructions 124; when these instructions are provided to processor 140, and processor 140 executes them, the machine is operated to perform the operations for reducing an input text image to the iconic version size, as represented in boxes 260 or 250 of FIG. 1.

Although not shown in FIG. 21, the stored data stored on data storage medium 130 may further include data indicating decoding instructions for decoding an iconic image version of an original image; when these instructions are provided to processor 140, and processor 140 executes them, the machine is operated to perform a decoding operation, as represented in the flowchart of FIG. 17.

The present invention produces an iconic, or size-reduced, version of an original text image that has embedded in it encoded binary data indicating any type of message. The encoding operation that encodes the binary data produces rectangular blocks that have a foreground color and size dimensions proportional to the iconic image so that when placed in the iconic image in horizontal lines, the blocks appear to a viewer to be representative of the text portion of the original image that they replace. A wide variety of encoding operations may be used to efficiently encode the binary data, including operations based on run-length limited encoding. Depending on the type of coding scheme selected, a second message may be encoded in the background color regions that separate the blocks. The message carried by the binary data may be any information suitable for a particular application, and need not be restricted to information about or related to the original image. The iconic image is suitable for use in a wide variety of document processing applications. While the invention has been described in conjunction with a specific embodiment, this description is not intended to limit the invention in any way. Accordingly, the invention as described herein is intended to embrace all modifications and variations that are apparent to those skilled in the art and that fall within the scope of the appended claims.

What is claimed is:

1. A method for operating a processor-controlled machine to encode binary data in an iconic version of an input text image; the machine including a signal source for receiving data; memory for storing data; and a processor connected for accessing instruction data stored in the memory for operating the machine; the processor being further connected for receiving data from the signal source; and connected for storing data in the memory; the method comprising:

receiving image definition data defining an input text image from the signal source; the input text image having a characteristic page layout appearance perceptible to a human viewer of the input text image when rendered and displayed for viewing; the input text image including at least one image region including image definition data defining text, referred to as an original text region;

receiving, from the signal source, binary data indicating a message to be encoded;

receiving image position input data from the signal source;

performing an encoding operation using the binary data and using the image position input data to produce image definition data defining a plurality of rectangular blocks each having a foreground color; the encoding operation mapping a portion of the binary data to a respective rectangular block referred to as an encoded data block;

performing an image reduction operation using the input text image to produce image definition data defining a reduced version of the input text image, referred to as an iconic image; the iconic image having the characteristic page layout appearance of the input text image when rendered for display and viewed by the user; and producing the iconic image including the encoded data blocks; the encoded data blocks being positioned in place of a reduced version of the original text region in the iconic image version of the input text image; the encoded data blocks each having size dimensions suitable for inclusion in the iconic image, and being arranged in horizontal lines separated vertically by image regions of a background color.

2. The method of claim 1 for operating a processor-controlled machine to encode binary data in an iconic version of an input text image wherein the encoding operation encodes, for all binary data to be encoded, a fixed-bit portion of the binary data into a single encoded data block of a foreground color having a characteristic property determined by a value computed using the fixed-bit portion of the binary data.

3. The method of claim 2 wherein the characteristic property is a size dimension of the encoded data block.

4. The method of claim 3 wherein the size dimension is a length of the encoded data block.

5. The method of claim 3 wherein the size dimension is a height of the encoded data block when positioned in a horizontal line with respect to a baseline of the horizontal line.

6. The method of claim 2 wherein the characteristic property is a vertical position of an encoded data block when positioned in a horizontal line with respect to a baseline of the horizontal line.

7. The method of claim 2 wherein the encoding operation further encodes second binary data in regions of background color positioned between encoded data blocks on a horizontal line.

8. The method of claim 7 wherein the second binary data indicates information for use in decoding the message encoded in the encoded data blocks.

9. The method of claim 8 wherein the information for use in decoding the message is error detection information.

10. The method of claim 7 wherein the second binary data indicates a second message.

11. The method of claim 1 for operating a processor-controlled machine to encode binary data in an iconic version of an input text image wherein the encoding operation maps fixed bit sized portions of the binary data to be encoded to respective length values using a numerical value computed from each fixed bit sized portion of the binary data; each respective length value being used to determine the horizontal length in the iconic image of a respective encoded data block.

12. The method of claim 1 for operating a processor-controlled machine to encode binary data in an iconic version of an input text image wherein the encoding operation encodes, for all of the binary data to be encoded, a variable bit sized portion of the binary data into one of a plurality of specific sequences of output message bits including both foreground and background colors; the plurality of specific sequences of output message bits being designed to produce varying-length encoded data blocks of foreground colors.

13. The method of claim 12 wherein the encoding operation uses a run-length limited coding scheme to encode the variable bit sized portions of the binary data into specific sequences of output message bits including both foreground and background colors.

14. The method of claim 1 for operating a processor-controlled machine to encode binary data in an iconic version of an input text image wherein the encoding operation uses a run-length limited coding scheme to encode the binary data into the encoded data blocks.

15. The method of claim 1 for operating a processor-controlled machine to encode binary data in an iconic version of an input text image wherein producing the iconic image including the encoded data blocks includes inserting image definition data defining a marking block in an iconic image position on the same horizontal line as are positioned encoded data blocks; the marking block marking the location of encoded data blocks for use by a subsequently performed decoding operation.

16. The method of claim 1 for operating a processor-controlled machine to encode binary data in an iconic version of an input text image wherein performing the encoding operation further includes producing second binary data indicating a second message to be encoded; the second message indicating information about the encoded data blocks; the encoding operation further encoding the second binary data with the binary data to be encoded; the second binary data encoded by the encoding operation being available in the iconic image to a decoding operation for use in decoding the encoded data blocks to retrieve the message indicated by the binary data.

17. The method of claim 1 for operating a processor-controlled machine to encode binary data in an iconic version of an input text image wherein the image position input data indicates coordinates of a bounding box in the input text image containing the at least one original text region; the image reduction operation determining positions of the encoded data blocks in the iconic image using the coordinates of the bounding box in the input text image.

18. The method of claim 17 wherein the coordinates of the bounding box containing the original text region are produced by performing an image segmentation operation using the input text image.

19. The method of claim 1 for operating a processor-controlled machine to encode binary data in an iconic version of an input text image wherein the image position input data indicates coordinates in the iconic image of a bounding box to be used to position the encoded data blocks in the iconic image.

20. An article of manufacture for use in a machine that includes a memory device for storing data; a storage medium access device for accessing a medium that stores data; and a processor connected for accessing the data stored in the memory device and for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, receiving image definition data defining an input text image from the signal source; the input text image having a characteristic page layout appearance perceptible to a human viewer of the input text image when rendered and displayed for viewing; the input text image including at least one image region including image definition data defining text, referred to as an original text region;

the processor, further in executing the instructions, receiving binary data indicating a message to be encoded;

the processor, further in executing the instructions, receiving image position input data;

the processor, further in executing the instructions, performing an encoding operation using the binary data and using the image position input data to produce image definition data defining a plurality of rectangular blocks each having a foreground color; the encoding operation mapping a portion of the binary data to a respective rectangular block referred to as an encoded data block;

the processor, further in executing the instructions, performing an image reduction operation using the input text image to produce image definition data defining a reduced version of the input text image, referred to as an iconic image; the iconic image having the characteristic page layout appearance of the input text image when rendered for display and viewed by the user;

the processor, still further in executing the instructions, producing the iconic image including the encoded data blocks; the encoded data blocks being positioned in place of a reduced version of the original text region in the iconic image version of the input text image; the encoded data blocks each having size dimensions suitable for inclusion in the iconic image, and being arranged in horizontal lines separated vertically by image regions of a background color.

* * * * *